(12) United States Patent
Handa

(10) Patent No.: US 11,778,145 B2
(45) Date of Patent: Oct. 3, 2023

(54) CONTROL APPARATUS, CONTROL METHOD, AND STORAGE MEDIUM

(71) Applicant: CANON KABUSHIKI KAISHA, Tokyo (JP)

(72) Inventor: Masahiro Handa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 106 days.

(21) Appl. No.: 17/346,082

(22) Filed: Jun. 11, 2021

(65) Prior Publication Data

US 2021/0392298 A1 Dec. 16, 2021

(30) Foreign Application Priority Data

Jun. 16, 2020 (JP) ................................ 2020-103906

(51) Int. Cl.
 *H04N 7/18* (2006.01)
 *H04N 23/66* (2023.01)

(52) U.S. Cl.
 CPC ............. *H04N 7/181* (2013.01); *H04N 23/66* (2023.01)

(58) Field of Classification Search
 CPC ...... H04N 7/183; H04N 23/45; H04N 5/2224; H04N 13/282
 See application file for complete search history.

(56) References Cited

U.S. PATENT DOCUMENTS

2018/0070009 A1* 3/2018 Baek .................. H04N 5/23232
2020/0007823 A1 1/2020 Ophir et al.

FOREIGN PATENT DOCUMENTS

JP 2016103788 A 6/2016
JP 2017211828 A 11/2017

* cited by examiner

*Primary Examiner* — Samira Monshi
(74) *Attorney, Agent, or Firm* — Canon U.S.A., Inc. IP Division

(57) ABSTRACT

A control server includes an information acquisition unit configured to acquire information indicating an imaging condition of a plurality of imaging apparatuses, a communication parameter determination unit configured to determine a time length during which each of a plurality of pieces of image data based on image capturing by the plurality of imaging apparatuses is communicable, based on the information acquired by the acquisition unit, and a control unit configured to perform control so that communication of the plurality of pieces of image data is performed in accordance with the time length determined by the determination unit.

17 Claims, 13 Drawing Sheets

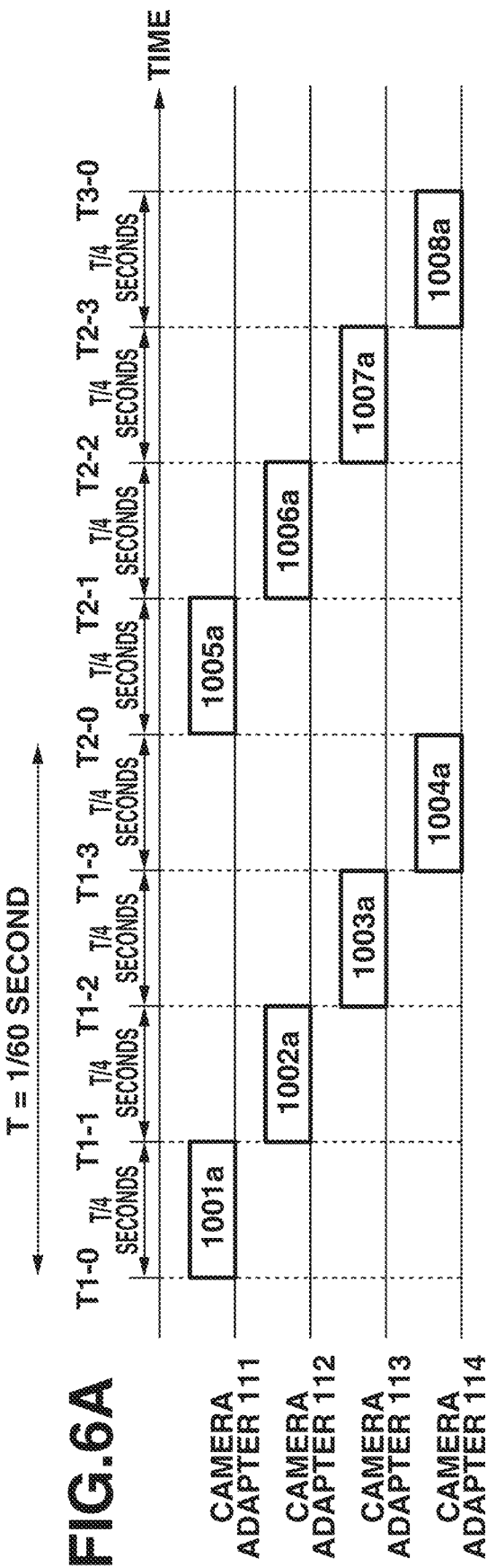
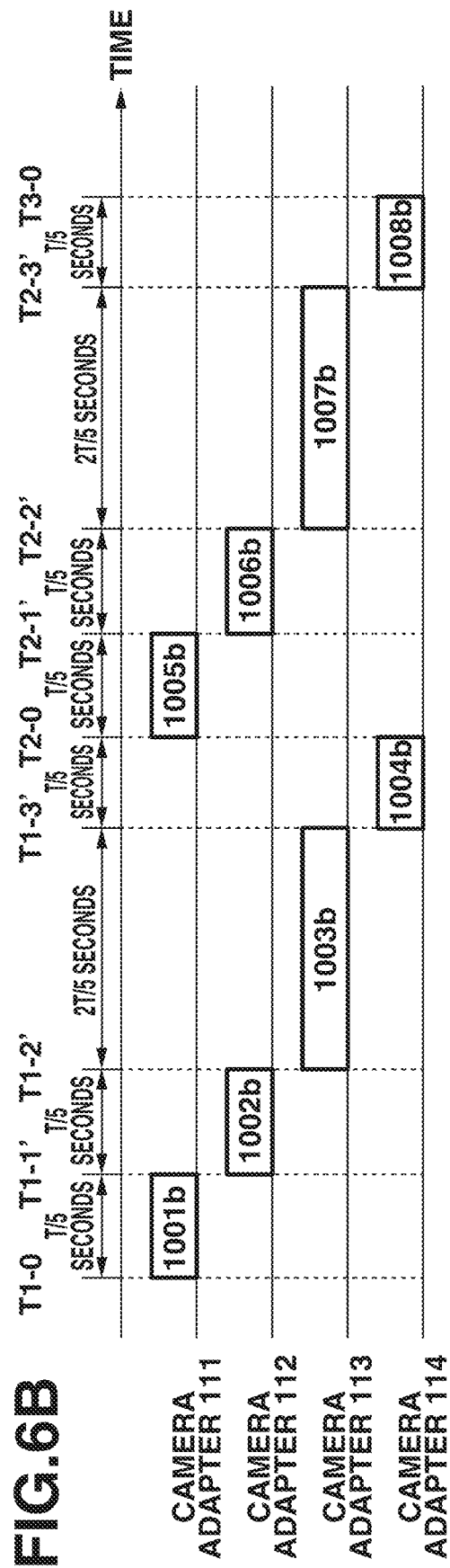

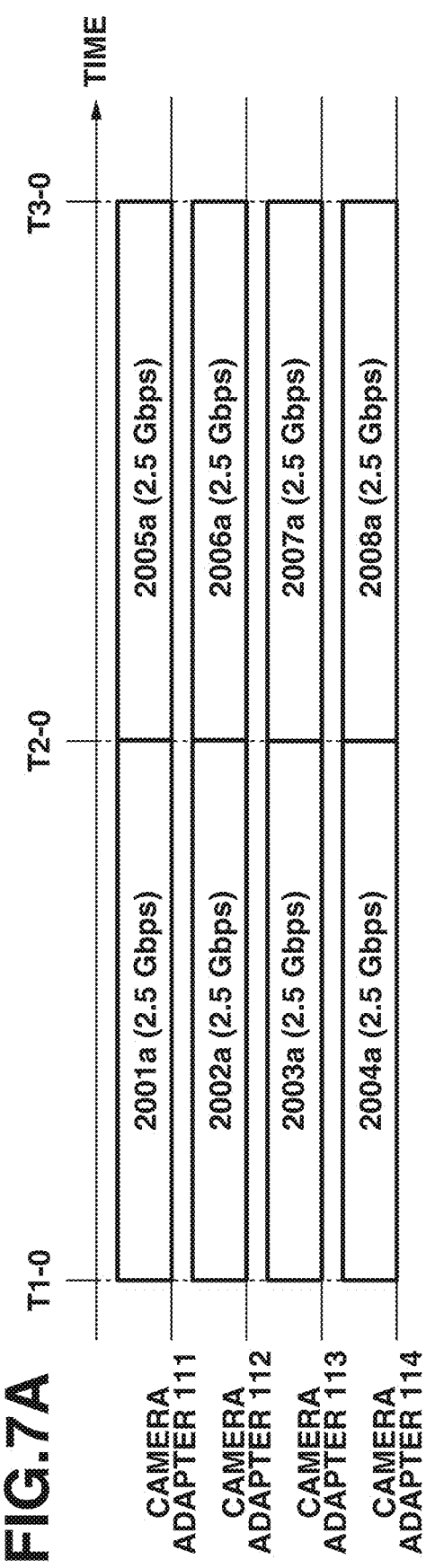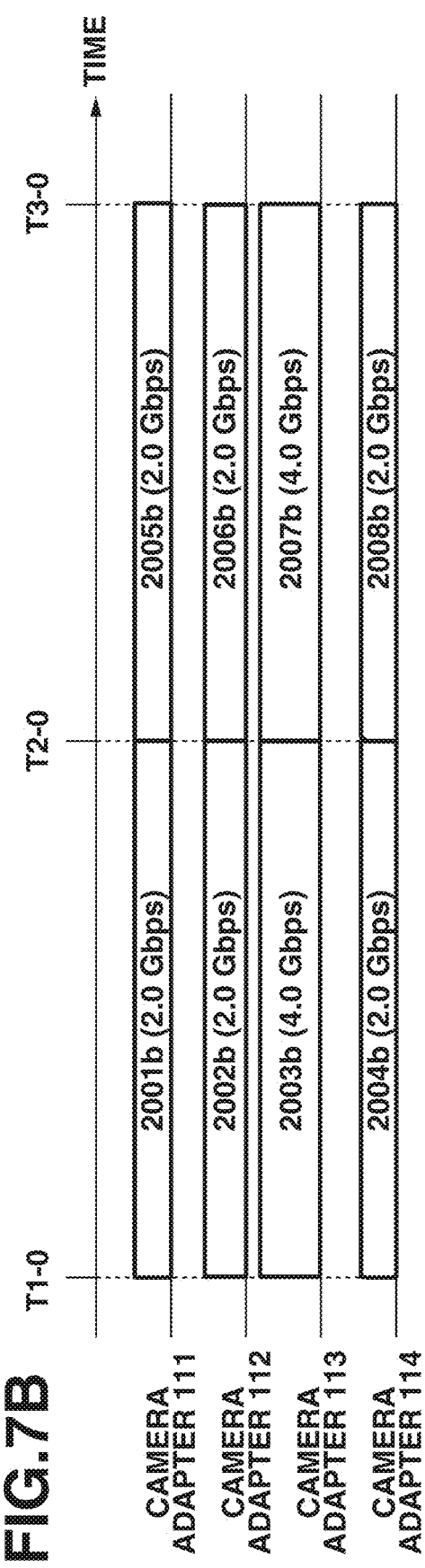

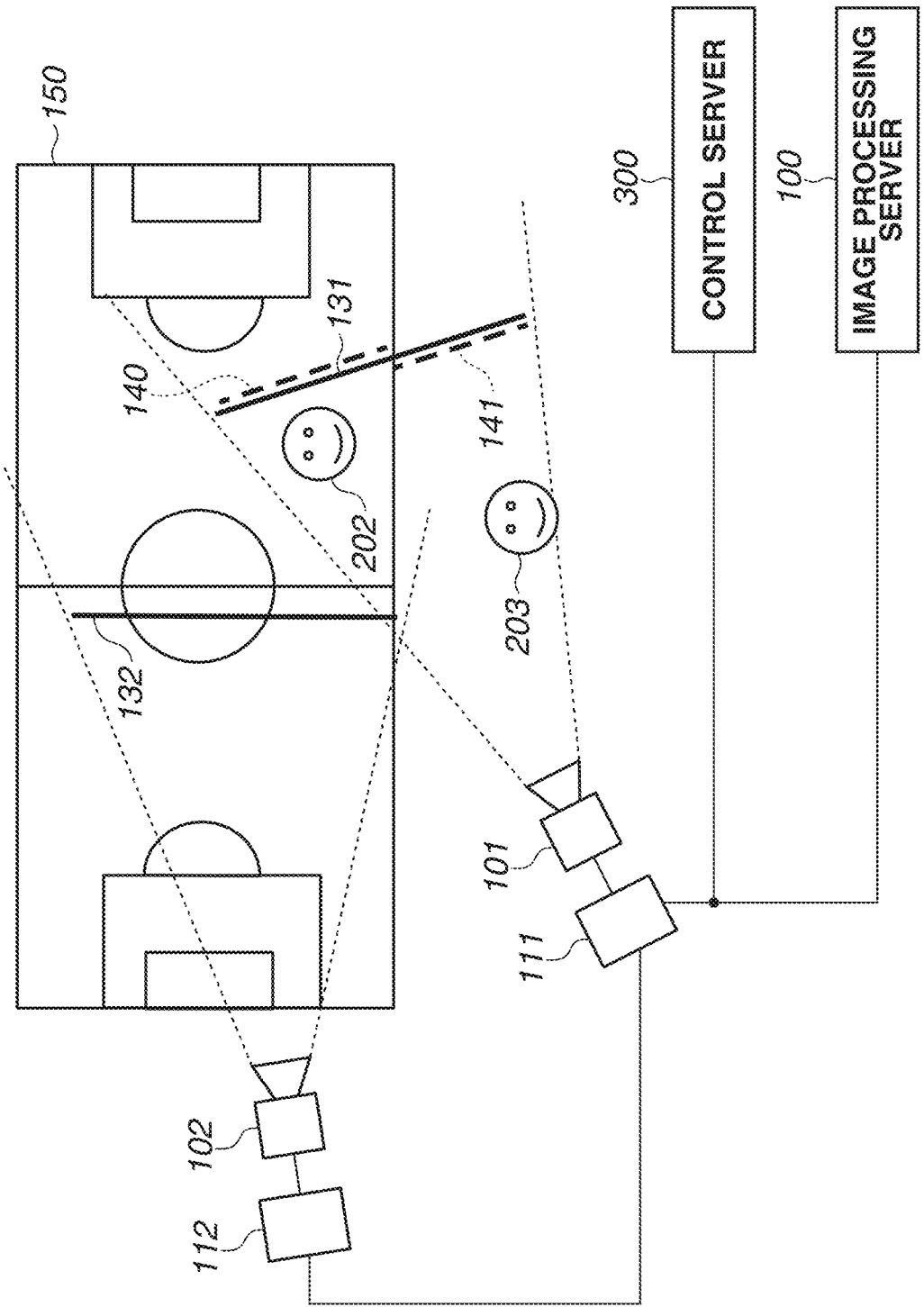

FIG.10
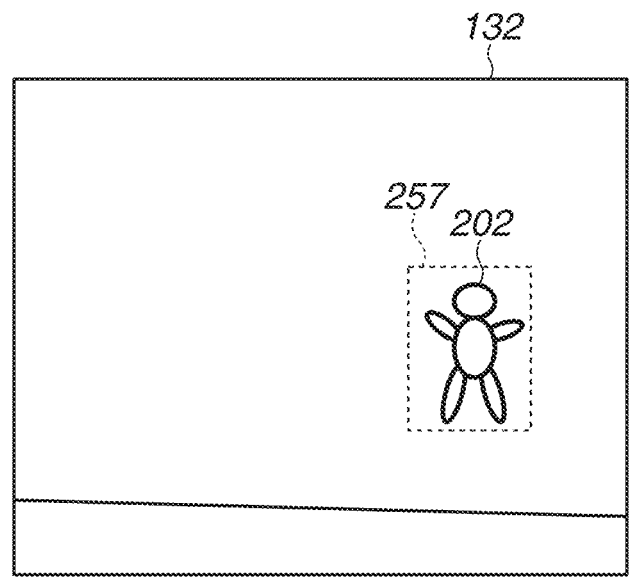
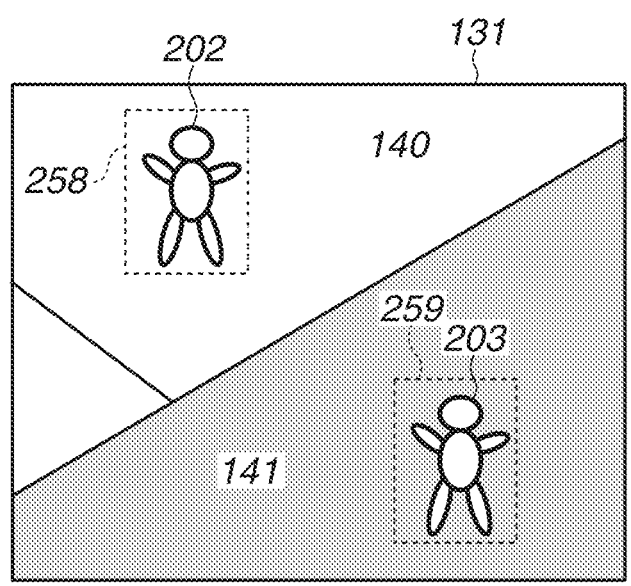

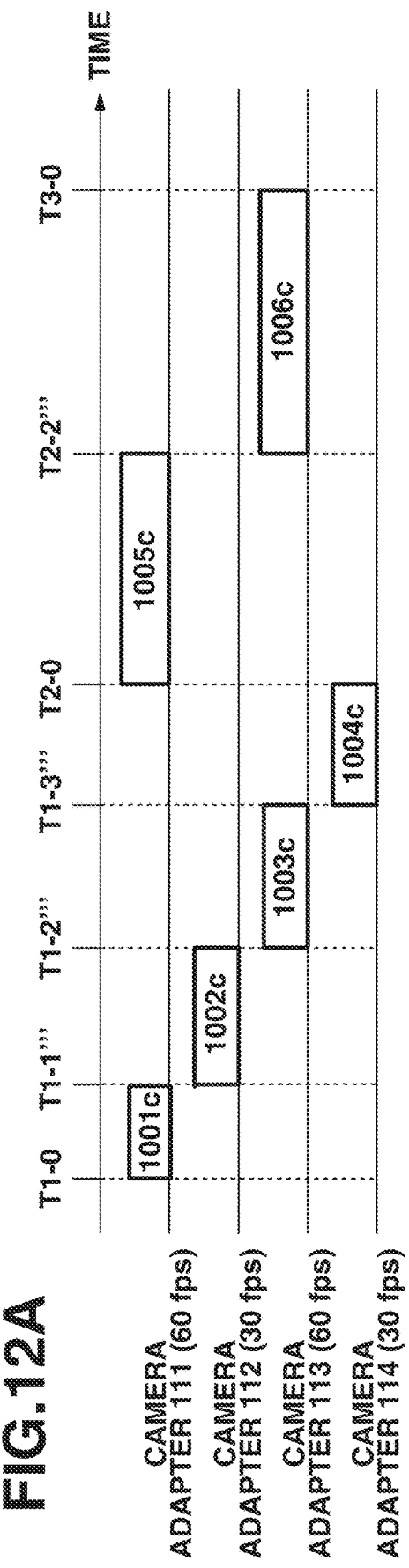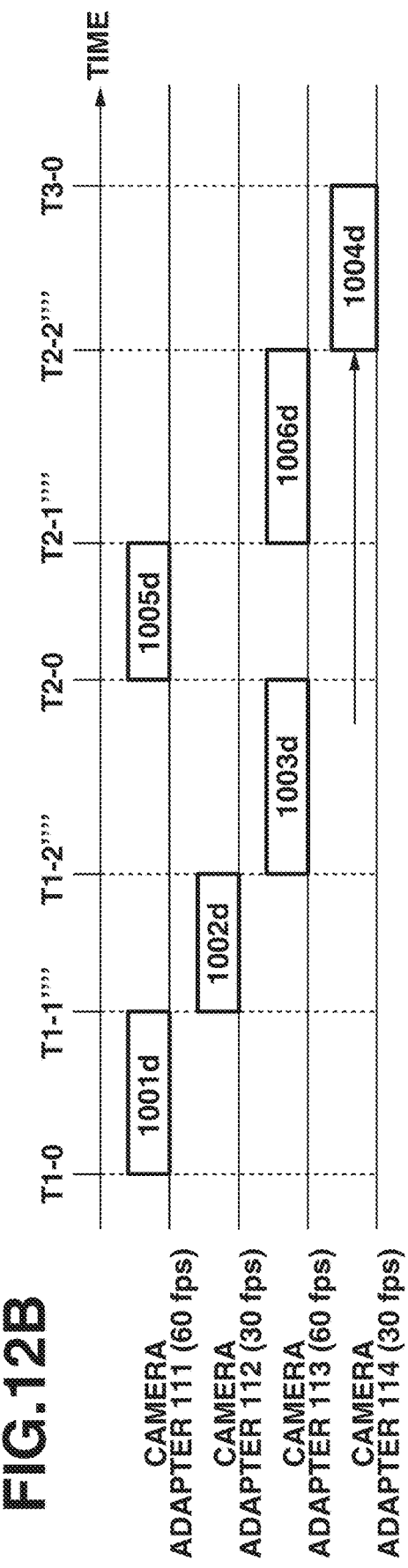

CONTROL APPARATUS, CONTROL METHOD, AND STORAGE MEDIUM

BACKGROUND

Field

The present disclosure relates to control of data communication.

Description of the Related Art

Attention has recently been being given to a technique for generating an image (virtual viewpoint image) viewed from a specified viewpoint (virtual viewpoint) by using a plurality of images captured by a plurality of imaging apparatuses disposed around an imaging region. The technique for generating a virtual viewpoint image enables users to view, for example, highlight scenes of soccer and basketball from various angles, thus providing users with a high degree of realistic sensation in comparison with regular images.

Japanese Patent Application Laid-Open No. 2017-211828 discloses image data communication performed by a plurality of image processing apparatuses. Each of the image processing apparatuses discussed in Japanese Patent Application Laid-Open No. 2017-211828 extracts a region corresponding to an object (hereinafter referred to as an object region) from a captured image acquired by an imaging apparatus connected to the image processing apparatus. The image processing apparatus transmits image data representing the extracted region to an apparatus for generating a virtual viewpoint image, via other image processing apparatuses connected in a daisy chain.

A description will be provided of consideration about a plurality of captured images acquired by a plurality of imaging apparatuses including imaging apparatuses having different imaging conditions. For example, in a case where the plurality of imaging apparatuses includes imaging apparatuses having different focal lengths as an imaging condition, an object captured by an imaging apparatus having a longer focal length is captured in a zoom way in comparison with an object captured by an imaging apparatus having a shorter focal length. Thus, it is assumed that the object region in the captured image acquired by the imaging apparatus having a longer focal length is larger than the object region in the captured image acquired by the imaging apparatus having a shorter focal length. The size of the object region may differ from each imaging apparatus depending on imaging conditions of the imaging apparatus, such as the distance between the imaging apparatus and the imaging region in addition to the focal length described above.

As the size of the object region increases, the data amount of image data representing the object region increases. Accordingly, the time period required to transmit the image data may also increase in accordance with the data amount. In this case, when a plurality of pieces of image data having different data amounts is transmitted, image data having a large amount cannot be transmitted within a predetermined time duration depending on, for example, communication limitations or the receiving capability of the reception side, possibly resulting in missing image data. In a system including a plurality of imaging apparatuses, image data transmission may not be suitably performed as described above depending on the imaging conditions for each imaging apparatus.

The present disclosure has been devised in view of the above-described issues. The present disclosure is directed to preventing image data from being lost due to the increase in the data amount of image data depending on imaging conditions.

SUMMARY

A control apparatus includes an acquisition unit configured to acquire information about an imaging condition of a plurality of imaging apparatuses, a determination unit configured to determine a time length during which each of a plurality of pieces of image data based on image capturing by the plurality of imaging apparatuses is communicable, based on the information acquired by the acquisition unit, and a control unit configured to perform control so that communication of the plurality of pieces of image data is performed in accordance with the time length determined by the determination unit.

Further features of the present disclosure will become apparent from the following description of exemplary embodiments with reference to the attached drawings.

BRIEF DESCRIPTION OF THE DRAWINGS

FIGS. 6A and 6B are timing charts illustrating timing of image data transmission in communication based on a time-division multiplex method.

FIGS. 7A and 7B are timing charts each illustrating timing of image data transmission in communication based on a bandwidth multiplex method.

FIG. 9 illustrates examples of camera arrangements.

FIG. 10 illustrates examples of captured images acquired in image capturing by the cameras.

FIGS. 12A and 12B are timing charts illustrating a method in which a plurality of cameras including cameras having different imaging frame rates transmits image data based on the time-division multiplex method.

DESCRIPTION OF THE EMBODIMENTS

Exemplary embodiments of the present disclosure will be described below with reference to the accompanying drawings. Components according to the following exemplary embodiments are to be considered as examples of embodiments of the present disclosure, and the present disclosure is not limited to these exemplary embodiments.

A first exemplary embodiment of the present disclosure will be described below. The present exemplary embodiment will be described below centering on an image processing system for generating a virtual viewpoint image. A virtual viewpoint image refers to an image representing a view from a specified viewpoint based on a plurality of images captured by a plurality of imaging apparatuses and a specified arbitrary viewpoint (virtual viewpoint). A virtual viewpoint image according to the present exemplary embodiment is also referred to as a free viewpoint image, and is not limited to an image corresponding to a viewpoint freely (arbitrarily) specified by the user. For example, an image corresponding to a viewpoint selected from among a plurality of candidates by the user is also included in virtual viewpoint images. Virtual viewpoint images according to the present exemplary embodiment may be static or moving images. The image data handled by the image processing system may be static or moving images. In other words, the image processing system according to the present exemplary embodiment can process static and moving images.

Figure 13:
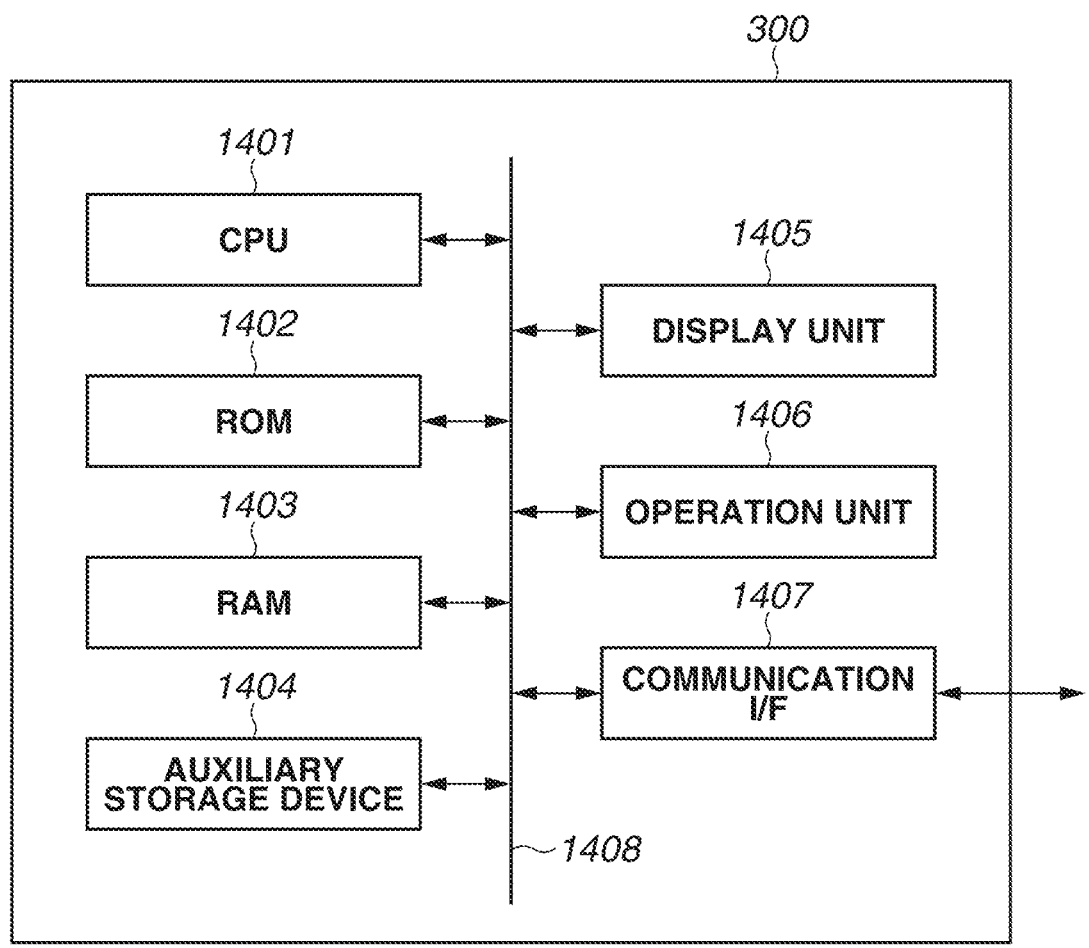
FIG. 13 illustrates a hardware configuration of the control server in the image processing system.

A hardware configuration of each apparatus included in the image processing system according to the present exemplary embodiment will be described below with reference to FIG. 13. While the hardware configuration of a control server (described below) will be described below as an example, camera adapters and an image processing server (described below) may have a similar hardware configuration. A control server 300 illustrated in FIG. 13 includes a central processing unit (CPU) 1401, a read only memory (ROM) 1402, a random access memory (RAM) 1403, an auxiliary storage device 1404, a display unit 1405, an operation unit 1406, a communication interface (I/F) 1407, and a bus 1408.

The CPU 1401 controls the entire control server 300 by using computer programs and data stored in the ROM 1402 and the RAM 1403 to implement the function of each processing unit included in the control server 300. The control server 300 may include one or a plurality of dedicated hardware components different from the CPU 1401, and at least part of processing of the CPU 1401 may be performed by the dedicated hardware components. Examples of dedicated hardware components include an Application Specific Integrated Circuit (ASIC), a Field Programmable Gate Array (FPGA), and a Digital Signal Processor (DSP). The ROM 1402 stores programs that do not need to be modified. The RAM 1403 temporarily stores programs and data supplied from the auxiliary storage device 1404 and data supplied from the outside via the communication I/F 1407. The auxiliary storage device 1404 includes, for example, a hard disk drive and stores various types of data, such as image data and audio data.

The display unit 1405 includes, for example, a liquid crystal display or light emitting diodes (LEDs) and displays a graphical user interface (GUI) for the user to operate the camera adapters. The operation unit 1406 includes, for example, a keyboard, a mouse, a joystick, and a touch panel. In response to receiving user operations, the operation unit 1406 inputs various instructions to the CPU 1401. The CPU 1401 operates as a display control unit for controlling the display unit 1405 and as an operation control unit for controlling the operation unit 1406.

The communication I/F 1407 is used to communicate with an apparatus outside the control server 300. For example, in a case where the control server 300 is connected via a wire to an external apparatus, a communication cable is connected to the communication I/F 1407. In a case where the control server 300 has a function of wirelessly communicating with an external apparatus, the communication I/F 1407 includes an antenna. The bus 1408 connects the units of the control server 300 and transmits information.

Although, in the present exemplary embodiment, the control server 300 includes therein the display unit 1405 and the operation unit 1406, at least either one of the display unit 1405 and the operation unit 706 may exist as different apparatuses outside the control server 300. Either one or both of the display unit 1405 and the operation unit 1406 may be absent. This also applies to the camera adapters and the image processing server (described below).

Figure 1:
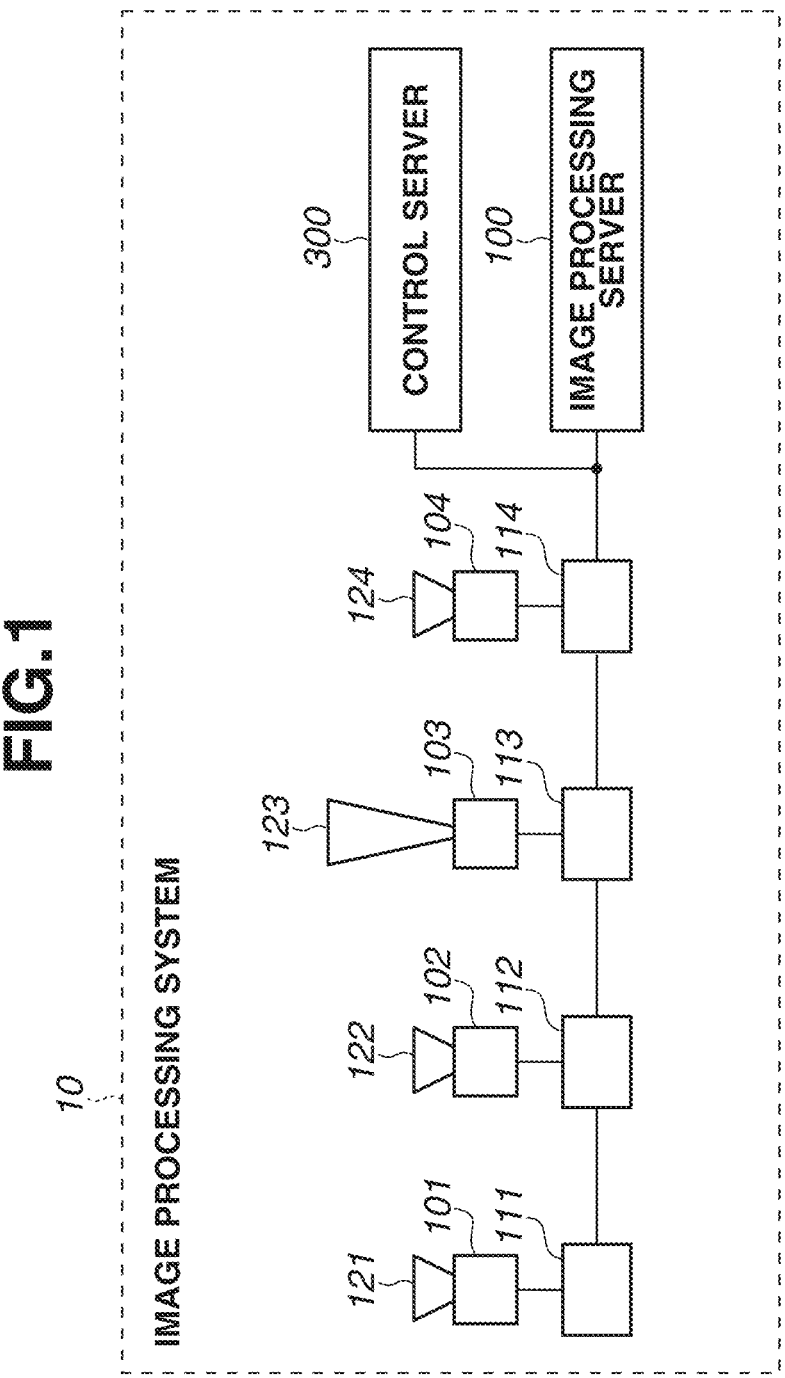
FIG. 1 illustrates a configuration of an image processing system.

FIG. 1 illustrates a configuration of an image processing system according to the present exemplary embodiment. An image processing system 10 includes cameras 101 to 104, camera adapters 111 to 114, an image processing server 100, and a control server 300. Each apparatus will be described below.

The cameras 101 to 104 are, for example, digital video cameras and other imaging apparatuses. The cameras 101 to 104 capture images of the imaging region to acquire captured images and transmit the acquired captured images to the connected camera adapters 111 to 114, respectively. The present exemplary embodiment will be described below on the premise that the imaging region is a stadium where a sports game is held. The imaging region can be implemented not only in a stadium but also in a field, gymnasium, and studio. The cameras 101 to 104 capture images in a state where the respective imaging timing is synchronized. The cameras 101 to 104 include lenses 121 to 124, respectively. The lenses 121 to 124 can be wide angle lenses, zoom lenses, or fixed focal length lenses. The focal lengths of wide angle lenses and zoom lenses can be adjusted by the control server 300, the image processing server 100, and the camera adapters 111 to 114 (described below).

While in the present exemplary embodiment, the angle of field is adjusted by using lens-based optical zooming, digital zooming may also be performed by the cameras 101 to 104 and the camera adapters 111 to 114. FIG. 1 illustrates the lenses 121 to 124 so that the differences in the focal length can be identified, and illustrates that the focal length of the lens 123 is longer than the focal lengths of other lenses 121, 122, and 124. Unless particularly distinguished in the following descriptions, the lenses 121, 122, 123, and 124 are also collectively referred to as a lens 121.

Effects of using the lenses 121 to 124 having different focal lengths are described below. In a region where important scenes are likely to occur (e.g., in front of goals in a soccer game), the use of a telephoto lens is desirable since a demand for high-resolution image capturing is assumed. For an imaging apparatus that captures the entire field, the use of a wide angle lens is desirable. For example, there is assumed a situation where image capturing is to be performed with zooming at a timing when an important scene occurs. In this case, a captured image closer to the image demanded by the user can be acquired if the focal length is dynamically adjustable. A plurality of imaging apparatuses are installed assuming the above-described situation.

Although, in the present exemplary embodiment, an imaging apparatus in which one lens is attached to each camera is used as an example, diverse types of apparatuses can be used as imaging apparatuses included in the image processing system 10. For example, an imaging apparatus in which a plurality of lenses is attached to one housing may be used. Although, in the exemplary embodiment, four cameras are installed, the number of installed cameras is not limited thereto but four or more imaging apparatuses may be installed. Camera arrangements are not limited to the example illustrated in FIG. 1. For example, the plurality of cameras is set to surround the stadium. Each camera may be an apparatus that captures not only images but also audio and other sensor information. Unless particularly distinguished in the following descriptions, the cameras 101, 102, 103, and 104 are also collectively referred to as a camera 101.

The camera adapters 111 to 114 acquire captured images acquired in image capturing by the cameras 101 to 104, respectively, and perform image processing. The image processing will be described in detail below. The camera adapters 111 to 114 transfer image data acquired through the image processing to the image processing server 100. Although, in the present exemplary embodiment, the four camera adapters 111 to 114 are to be used in conformance with the number of cameras 101 to 104, the number of camera adapters is not limited thereto. For example, a plurality of cameras may be connected to one camera adapter. Although, in the present exemplary embodiment, the camera adapters and the cameras are described as different apparatuses, an imaging apparatus may include the cameras and the camera adapters. Unless particularly distinguished in the following descriptions, the camera adapters 111, 112, 113, and 114 are also collectively referred to as a camera adapter 111.

The image processing server 100 acquires a plurality of image data pieces transmitted from the camera adapters 111 to 114 and generates a virtual viewpoint image based on the plurality of acquired image data pieces. The image processing server 100 according to the present exemplary embodiment generates three-dimensional geometric data representing the three-dimensional shape of an object based on the plurality of acquired image data pieces. The image processing server 100 generates a virtual viewpoint image by using the generated three-dimensional geometric data and information indicating the virtual viewpoint acquired by a user specification. The method for generating a virtual viewpoint image is not limited thereto. For example, a method for generating a virtual viewpoint image based on image-based rendering is also applicable. The control server 300 is a control apparatus that controls the image processing system 10. The control server 300 controls the cameras 101 to 104, the lenses 121 to 124, the camera adapters 111 to 114, and the image processing server 100.

The above-described apparatuses included in the image processing system 10 are connected to each other via a local area network (LAN). The network topology according to the present exemplary embodiment is based on the daisy chain connection. More specifically, as illustrated in FIG. 1, the plurality of camera adapters 111 to 114 is connected in a daisy chain. According to the present exemplary embodiment, the camera adapter 111 transmits image data acquired through the image processing performed by the camera adapter 111 itself, to the camera adapter 112. The camera adapter 112 transmits the image data acquired from the camera adapter 111 and image data acquired through the image processing performed by the camera adapter 112 itself, to the camera adapter 113. The camera adapter 114 at the end of the daisy chain connection transmits the image data acquired from the camera adapter 113 and image data acquired through the image processing performed by the camera adapter 114 itself, to the image processing server 100. In the daisy chain connection, the side of the image processing server 100 is the downstream side. Each of the camera adapters 111 to 114 is configured to transmit the image data received from the corresponding upstream one of the camera adapters 111 to 114 and image data acquired by itself, to the corresponding downstream one of the camera adapters 111 to 114.

Figure 2:
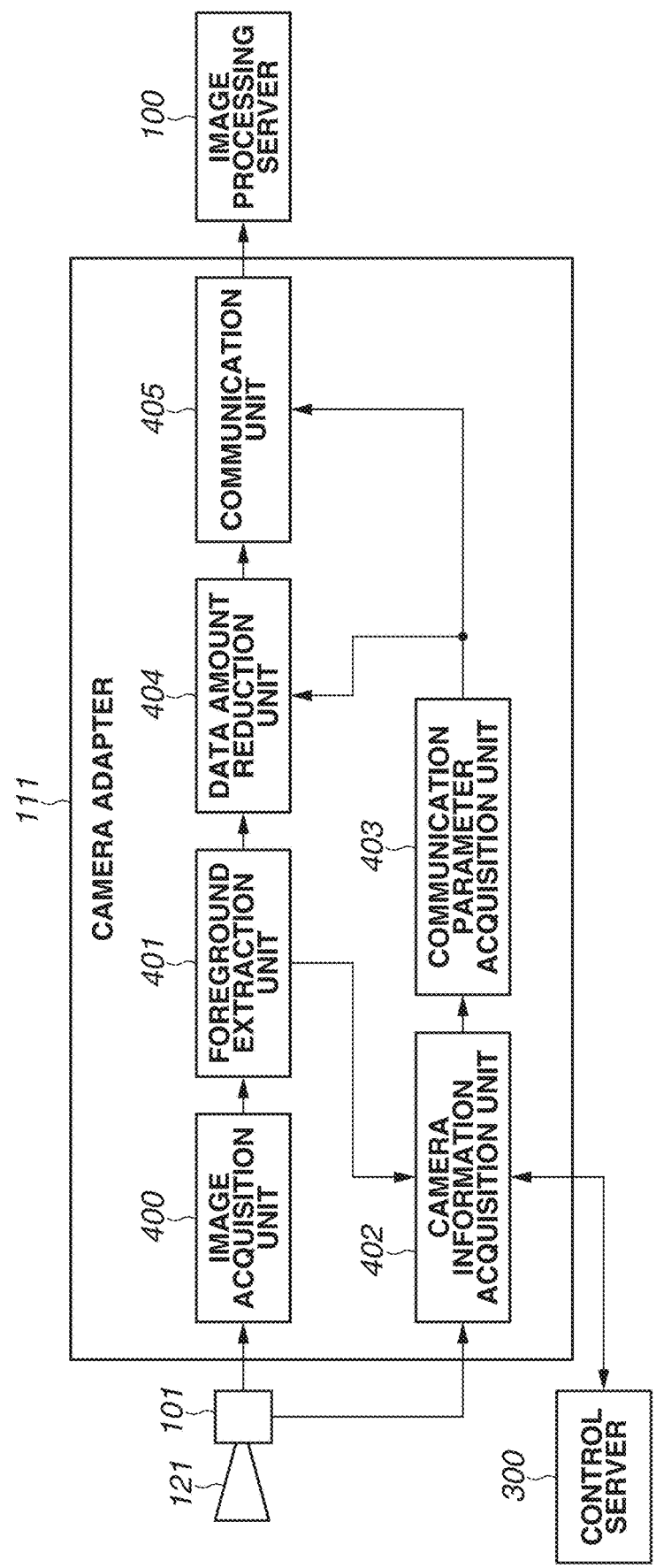
FIG. 2 illustrates a function configuration of a camera adapter.

A function configuration of the camera adapter 111 will be described below with reference to FIG. 2, as a representative example of the function configuration of the camera adapters 111 to 114. The camera adapter 111 includes an image acquisition unit 400, a foreground extraction unit 401, a camera information acquisition unit 402, a communication parameter acquisition unit 403, a data amount reduction unit 404, and a communication unit 405. Referring to FIG. 2, the camera adapter 111 is directly connected to the control server 300 and the image processing server 100. However, since the plurality of camera adapters 111 to 114 is connected in a daisy chain, one that is not directly connected to the control server 300 and the image processing server 100 is present. One, out of the camera adapters 111 to 114, that is not directly connected to the control server 300 and the image processing server 100 can communicate with the control server 300 and the image processing server 100 via the corresponding downstream one of the camera adapters 111 to 114. Processing units of the camera adapter 111 will be described below.

Figure 3:
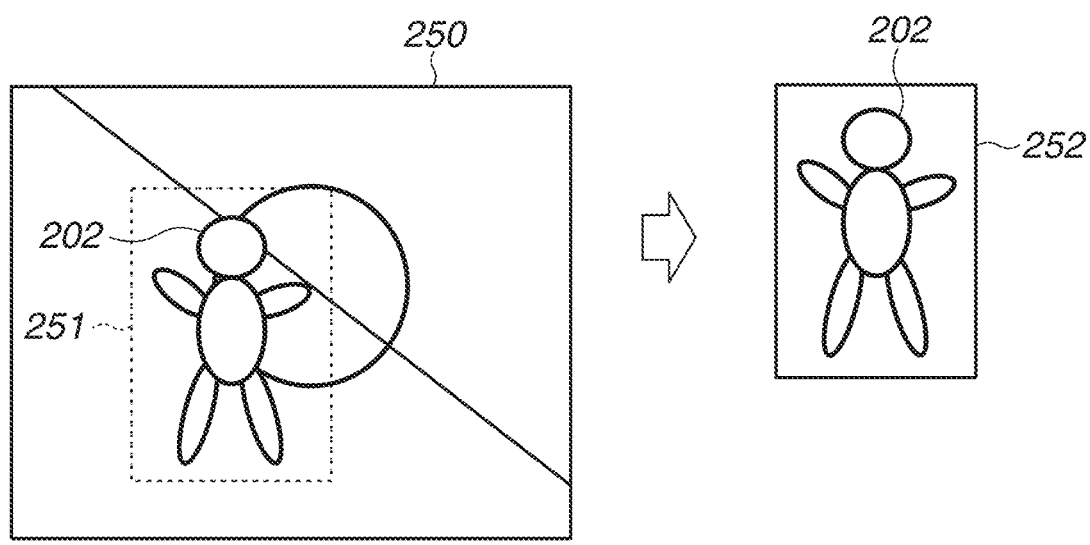
FIG. 3 illustrates examples of a captured image and a foreground image.
Figure 4:
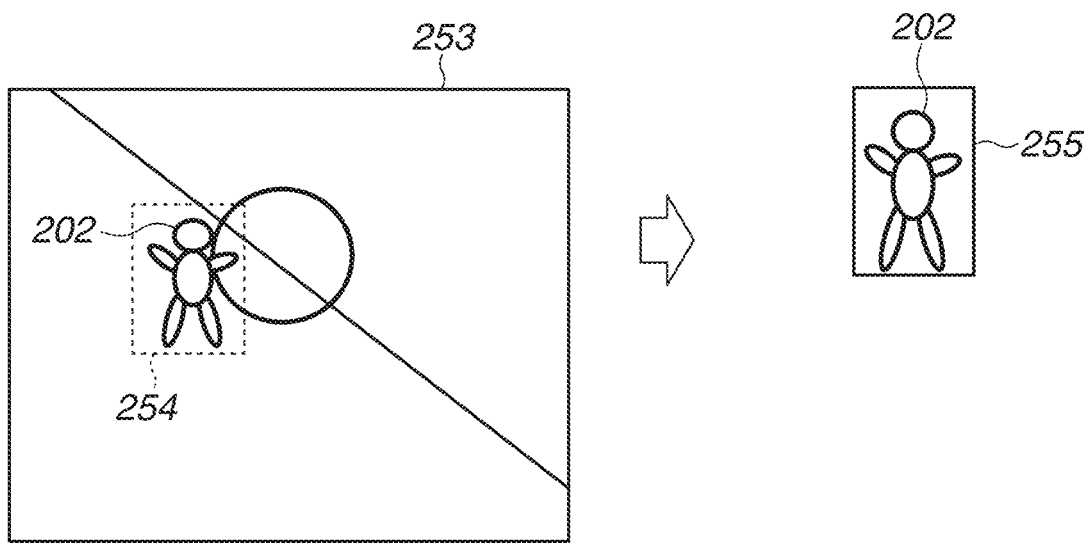
FIG. 4 illustrates other examples of a captured image and a foreground image.

The image acquisition unit 400 acquires an image acquired by the camera 101 capturing an image of the imaging region. Here, an image 253 illustrated in FIG. 4 is a captured image acquired through image capturing performed by the camera 101 in FIG. 1. An image 250 in FIG. 3 is a captured image acquired through image capturing performed by the camera 103 in FIG. 1. The cameras 103 and 101 capture an image of the same player 202. Since the camera 103 has a longer focal length than the camera 101, the image 250 has a larger region corresponding to the object in the captured image than that in the image 253. According to the present exemplary embodiment, moving objects, such as persons and a ball, in the imaging region are referred to as a foreground. In a captured image acquired by capturing an image of the foreground, the region corresponding to the foreground is referred to as a foreground region. In the imaging region, objects different from the foreground is referred to as a background.

The foreground extraction unit 401 extracts the foreground region from the captured image acquired from the camera 101 by the image acquisition unit 400, and performs image processing of generating image data (hereinafter referred to as a foreground image) including the extracted foreground region. Referring to the example illustrated in FIG. 3, the foreground extraction unit 401 in the camera adapter 113 connected to the camera 103 extracts the foreground region from the image 250 and generates a foreground image 252. Referring to the example illustrated in FIG. 4, the foreground extraction unit 401 in the camera adapter 111 connected to the camera 101 extracts the foreground region from the image 253 and generates a foreground image 255.

For example, the foreground extraction unit 401 extracts the foreground region by acquiring the difference between a pre-generated image representing the background (hereinafter referred to as a background image) and the captured image. Examples of methods for extracting the foreground region include a method of acquiring the difference between imaging frames captured in succession, a method of identifying the foreground region by using machine learning, and other various methods. Examples of methods for calculating the difference include the use of color difference and luminance difference. As the foreground image, the foreground extraction unit 401 generates texture data having color information for an object and silhouette data not including the color information for the object. The silhouette data is generated by setting the image value of the foreground region to 1, and setting the pixel value of the region other than the foreground region to 0.

The foreground extraction unit 401 according to the present exemplary embodiment generates rectangular image data including the foreground region as the foreground image. However, the foreground extraction unit 401 can also generate a foreground image by clipping along the outline of the foreground. More specifically, the foreground image is only required to include at least pixel values corresponding to the foreground region. Referring to the examples illustrated in FIGS. 3 and 4, the object corresponding to the foreground in the captured image is only the player 202. However, a plurality of foregrounds may be included in the captured image. If a plurality of foregrounds is included in the captured image, a foreground image is generated for each foreground. Referring to the examples in FIGS. 3 and 4, the image 250 has a larger foreground region in the captured image than that in the image 253. Thus, also for the generated foreground image, the foreground image 252 has a larger data amount than the foreground image 255.

The camera information acquisition unit 402 acquires information about camera and lens settings (hereinafter referred to as camera information). The camera information acquisition unit 402 acquires the camera information from the camera 101 directly connected to the camera adapter 111 itself and the storage unit, such as the auxiliary storage device 1404 in the camera adapter 111. The camera information acquisition unit 402 can transmit the camera information acquired from the camera 101 to the control server 300 and acquire the camera information from the control server 300. This configuration enables the camera information acquisition unit 402 to acquire, via the control server 300, the camera information related to the camera 101 not directly connected to the camera adapter 111 itself. The camera information includes, for example, information about the following items:

(1) The sensor size of the camera 101;
(2) The type of the lens 121 included in the camera 101;
(3) The focal length of the lens 121 included in the camera 101;
(4) The imaging range of the lens 121 included in the camera 101;
(5) The exposure of the camera 101;
(6) The installation position, the image capturing direction, and the distance from the imaging region of the camera 101;
(7) The transmission destination and the communication path of image data based on image capturing by the camera 101;
(8) The priority of image data based on image capturing by the camera 101; and
(9) The data amount of image data based on image capturing by the camera 101.

The camera information acquisition unit 402 can acquire, for example, the information about the items (1) to (6) from the camera 101 directly connected to the camera information acquisition unit 402. The camera information acquisition unit 402 prestores the information about the item (7), for example, in the storage unit, such as the auxiliary storage device 1404, and acquires the stored information from the storage unit. The information about the item (8) is used for determining the priority of transmission of the image data generated based on the captured image to be transmitted from the camera 101, in comparison with other one of the camera adapters 111 to 114. The priority is prestored in the respective camera adapters 111 to 114 or determined by the control server 300 and then transmitted to the camera information acquisition unit 402 in the respective camera adapters 111 to 114. The information about the item (9) is acquired, for example, by the foreground extraction unit 401 calculating the data amount of the image data at the time of image data generation and then transmitting the data amount to the camera information acquisition unit 402. The camera information acquisition unit 402 can store and reference the data amount of the image data based on image capturing performed in the past, in the auxiliary storage device 1404. The camera information acquisition unit 402 can acquire the data amount of the image data to be transmitted by each of the camera adapters 111 to 114, from the control server 300.

The above-described information included in the camera information is to be considered as merely an example and is not limited to this example. For example, the camera information may include only arbitrary information out of the information about the items (1) to (9) or include information different from the information about the items (1) to (9).

The communication parameter acquisition unit 403 acquires communication parameters determined based on the camera information acquired from the camera information acquisition unit 402. The communication parameters are information for controlling image data communication and are used for processing that is performed by the communication unit 405 and the data amount reduction unit 404 (described below). The communication parameters according to the present exemplary embodiment are determined by the control server 300 and then transmitted to the communication parameter acquisition unit 403 in the respective camera adapters 111 to 114 via the communication path. The communication parameter acquisition unit 403 may be configured to acquire the communication parameters from the control server 300 without using the communication path. The communication parameters can include various information in accordance with the image data communication method. Examples of communication methods and communication parameters will be described below.

The data amount reduction unit 404 reduces the data amount of the image data generated by the foreground extraction unit 401, based on the communication parameters acquired by the communication parameter acquisition unit 403. The data amount reduction unit 404 can calculate the communicable data amount by using the information included in the communication parameters. Thus, the data amount reduction unit 404 performs processing for fitting the data amount of the image data generated by the foreground extraction unit 401 into the calculated communicable data amount. Examples of processing for reducing the data amount include the following pieces of processing:

Changing quantization parameters to be used in image data compression or changing the compression method from lossless compression to lossy compression to achieve higher compression rate;
  Deleting foreground images in ascending order of size of the foreground regions;
  Deleting foreground images in descending order of distance thereof to the center of the captured image;
  Presetting priority for each partial region in the imaging region, and deleting foreground images corresponding to an object included in the respective partial regions in ascending order of priority of the partial region;
  Presetting priority for each object (e.g., for each of a plurality of players 202), and deleting foreground images corresponding to the respective objects in ascending order of priority of the object;
  Deleting foreground images corresponding to an object in descending order of distance of the object from a specific object; and
  Deleting all foreground images.

The data amount reduction unit 404 performs at least one piece of arbitrary processing out of the above-described processing to fit the data amount into the communicable data amount. Which processing is to be performed by the data amount reduction unit 404 may be preset for each of the camera adapters 111 to 114 or specified by a user operation on the operation unit 1406. In a case where the data amount of the image data falls within the communicable data amount, the data amount reduction unit 404 does not reduce the data amount. However, a generation region for generating a three-dimensional model may be preset for the imaging region, and the foreground images corresponding to objects outside the generation region may be deleted regardless of the data amount. Alternatively, the foreground extraction unit 401 may be configured not to generate foreground images corresponding to objects outside the generation region. This enables the image processing server 100 to communicate image data that is not used to generate a virtual viewpoint image and to prevent the communication path from being unnecessarily used. The data amount reduction unit 404 may be configured to store original image data before being subjected to the processing of reducing the data amount, in the auxiliary storage device 1404. This enables the camera adapter 111 to transmit high-quality image data before being subjected to the data amount reduction, at the timing when limitations on the communication bandwidth are alleviated afterwards.

The communication unit 405 performs image data communication in conformance with a predetermined communication method based on the communication parameters acquired by the communication parameter acquisition unit 403. The communication unit 405 also communicate such image data as the background image in addition to the foreground image generated by the foreground extraction unit 401.

Figure 5:
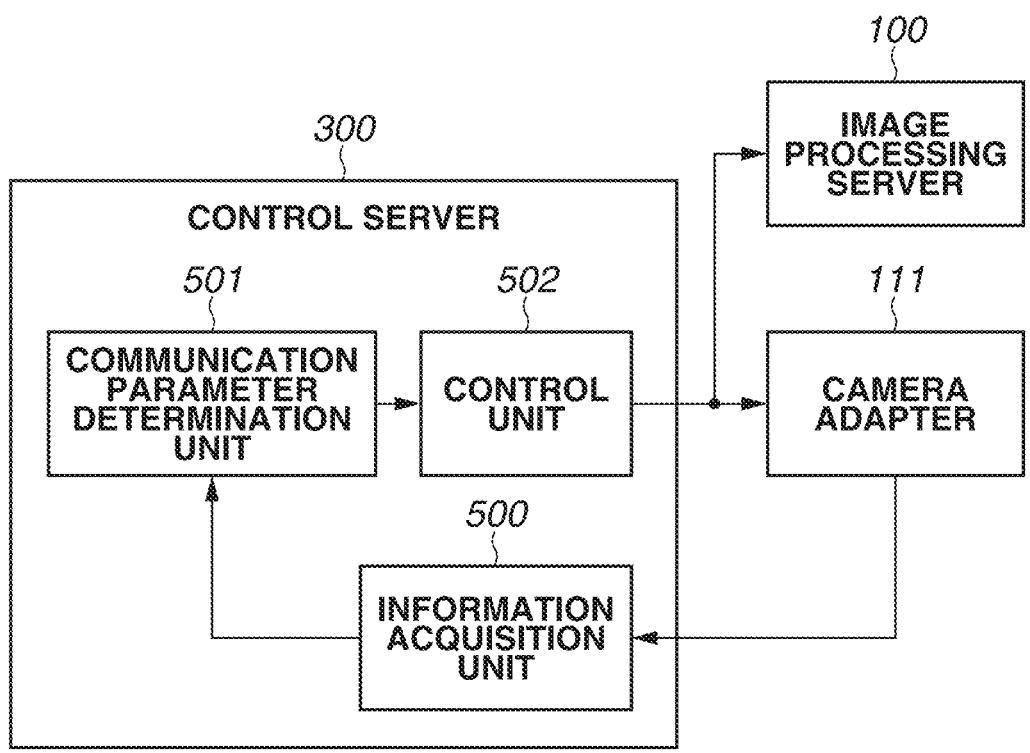
FIG. 5 illustrates a function configuration of a control server.

A function configuration of the control server 300 will be described below with reference to FIG. 5. The control server 300 includes an information acquisition unit 500, a communication parameter determination unit 501, and a control unit 502. Processing units of the control server 300 will be described below.

The information acquisition unit 500 acquires the camera information transmitted from the plurality of camera adapters 111 to 114. The communication parameter determination unit 501 determines the communication parameters based on the camera information acquired by the information acquisition unit 500. The control unit 502 controls the plurality of camera adapters 111 to 114 to perform communication based on the communication parameters determined by the communication parameter determination unit 501. In controlling the camera adapters 111 to 114, the control unit 502 also transmits the camera information and the communication parameters acquired from the camera adapters 111 to 114. This enables the respective camera adapters 111 to 114 to grasp the camera information about the corresponding one of the cameras 101 to 104 not directly connected thereto, and perform processing of reducing the data amount based on the communication parameters. The control unit 502 issues instructions to start and end communication performed by the respective camera adapters 111 to 114 and performs processing of changing the transmission destination and the communication path of the image data that the camera adapters 111 to 114 communicate.

The control unit 502 controls not only communication performed by the respective camera adapters 111 to 114 but also the cameras 101 to 104, the lenses 121 to 124, and the image processing server 100. As processing for controlling the cameras 101 to 104, the control unit 502 performs processing of starting and ending image capturing, changing the camera parameters, such as the exposure and shutter speed, and monitoring changes of the camera parameters. As processing of controlling the lenses 121 to 124, the control unit 502 performs processing of adjusting the focal length and focus and monitoring changes of the focal length and focus. As processing of controlling the image processing server 100, the control unit 502 controls the start and end of processing of generating a virtual viewpoint image.

Control processing performed by the control unit 502 is not limited to the above-described processing. The control unit 502 may perform other control processing, monitoring of each apparatus, and information acquisition. The control unit 502 may control the camera 101 and the lens 121 via the camera adapter 111 or directly control the imaging apparatus and the lens 121. At least part of processing of controlling the camera adapter 111, the camera 101, the lens 121, and the image processing server 100 performed by the control unit 502 may be performed by the camera adapter 111, the camera 101, and the image processing server 100, respectively.

The function configurations of the camera adapters 111 to 114 and the control server 300 have been described above. The communication method and communication parameters to be used by the image processing system 10 according to the present exemplary embodiment will be described in detail below. A description will be provided of a communication method that is performed by the control server 300 to control communication of a plurality of image data pieces by using the plurality of camera adapters 111 to 114 based on image capturing conditions of the plurality of cameras 101 to 104.

<Time-Division Multiplex Method>

An example where the camera adapters 111 to 114 communicates image data by using the time-division multiplex method in the image processing system 10 will be described below. FIGS. 6A and 6B are timing charts illustrating the timing of image data transmission in a case where the camera adapters 111 to 114 perform communication by using the time-division multiplex method. The timing of image data transmission in the initial state will be described below with reference to FIG. 6A.

Referring to FIG. 6A, the times T1-0, T2-0, . . . indicate the timing when the camera 101 performs image capturing. The times T1-0, T2-0, . . . each correspond to the frame rate of image capturing by the camera 101. For example, when the camera 101 performs image capturing at 60 frames per second (fps), the time period between the times T1-0 and T2-0 is 1/60 second. The times T1-1, T1-2, T1-3, . . . are the time determined by dividing the time period between the times T1-0 and T2-0 by the number of cameras. The times T2-1, T2-2, T2-3, . . . are also determined in a similar way. According to the present exemplary embodiment, since four cameras 101 to 104 are provided, the time period from the time T1-0 to the time T1-1 is 1/240 second at a frame rate of 60 fps.

In each of the camera adapters 111 to 114, the timing of starting image data transmission and the time length that can be used for image data communication are preset as initial values. For example, assuming that the time T1-0 is 0 seconds, the time T1-1 corresponds to 1/240 second, the time T1-2 corresponds to 1/120 second, the time T1-3 corresponds to 1/80 second, and the time T2-0 corresponds to 1/60 second. The time T2-1 and subsequent times are determined in a similar way. Each of the camera adapters 111 to 114 starts image data transmission to the downstream camera adapter at the time specified by the control server 300. In this case, the time length during which the communication path for image data communication can be used refers to the time period since the camera adapter starts the transmission of the image data based on image capturing by the camera directly connected to the camera adapter itself until the adjacent downstream camera adapter starts image data transmission similarly. Although not illustrated in FIGS. 6A and 6B, each of the camera adapters 111 to 114 transmits image data transmitted from the corresponding upstream one of the camera adapters 111 to 114 in the time period during which it is not transmitting image data based on image capturing by the corresponding one of the cameras 101 to 104 directly connected thereto. For example, the camera adapter 112 acquires image data 1001a transmitted from the camera adapter 111 and transmits the acquired image data 1001a to the camera adapter 113 during the time period between the times T1-0 and T1-1. At this time, a delay can occur in the time period between image data acquisition and image data transmission. The transmission of the image data based on image capturing by the respective cameras 101 to 104 connected to the corresponding one of the camera adapters 111 to 114 itself is delayed from the start time of transmission. However, since these delays are extremely short, the following descriptions will be made on the premise that no delay occurs.

Although, in the present exemplary embodiment, the timing of image data transmission is determined by dividing the time period from the time when the plurality of cameras 101 to 104 performs image capturing to the time when the following image capturing is performed. The configuration is not limited thereto. For example, the start time of image data transmission by the camera adapter 111 does not necessarily need to coincide with the times T1-0, T2-0, . . . . The time length that can be used for image data communication (a time period of 1/60 second in this case) may be acquired by dividing the time period identified based on the frame rate of image capturing performed by the plurality of cameras 101 to 104.

Referring to FIG. 6A, the camera adapter 111 starts transmission of the image data 1001a based on image capturing by the camera 101 connected to the camera adapter 111 itself at the time T1-0, and completes image data transmission to the downstream camera adapter 112 during the time period before the time T1-1. Similarly, the camera adapter 112 starts the transmission of image data 1002a based on image capturing by the camera 102 connected to the camera adapter 112 itself at the time T1-1, and completes image data transmission to the downstream camera adapter 113 during the time period before the time T1-2. This also applies to the camera adapter 113. The camera adapter 114 at the end of the daisy chain connection starts the transmission of image data 1004a at the time T1-3, and completes image data transmission to the image processing server 100 during the time period before the time T2-0 at which the following image capturing is performed. By performing communication in this way, the plurality of camera adapters 111 to 114 can complete image data transmission corresponding to all of the cameras 101 to 104 during the time period from when image capturing is started to when the following image capturing is performed by the respective cameras 101 to 104. After the time T2-0, the image data communication is also performed in a similar way.

At this time, the data amount reduction unit 404 calculates the data amount communicable in 1/240 seconds for the image data to be transmitted by each of the camera adapters 111 to 114, based on the transmission bandwidth of the communication path. If the data amount of the image data exceeds the calculated communicable data amount, the data amount reduction unit 404 performs processing of reducing the data amount. The image data transmission may be performed without using all of 1/240 seconds. For example, if the data amount of the image data is smaller than the calculated communicable data amount, image data transmission may be completed in a time period shorter than 1/240 seconds. Also, in this case, each of the camera adapters 111 to 114 does not change the start time of image data transmission.

FIG. 6B illustrates an example in which the time length to be used for image data transmission is changed based on the focal length of the respective lenses 121 to 124. Referring to the example illustrated in FIG. 6B, the focal length of the lens 123 is changed to be longer than the focal lengths of other lenses 121, 122, and 124. As described above, the data amount of the foreground image data may increase with increasing focal length of the respective lenses 121 to 124. Thus, if image data communication is performed based on the communication timing in the initial state, image data based on image capturing by the camera 103 may be lost in a time period of 1/240 seconds. The image data based on image capturing by other cameras 101, 102, and 104 may become smaller in data amount than the image data for the camera 103 and therefore may have been transmitted in a time period shorter than 1/240 second. However, the time when each of the camera adapters 111 to 114 starts image data transmission remains unchanged. In such a situation, the communication path cannot be effectively utilized, possibly resulting in such an issue, the degradation of the communication efficiency and the occurrence of missing image data. Thus, the control server 300 changes the time length that can be used for image data transmission by each of the camera adapters 111 to 114, based on the focal length of the respective lenses 121 to 124.

The information acquisition unit 500 in the control server 300 acquires, as imaging conditions, information about the focal length of each of the cameras 101 to 104 (the information about item (3) included in the camera information) and transmits the information to the communication parameter determination unit 501. The communication parameter determination unit 501 determines the time when each of the camera adapters 111 to 114 starts image data transmission and the time length that can be used for image data communication by each of the camera adapters 111 to 114, as communication parameters. For example, in a case where the focal length of the lens 123 is twice the focal lengths of other lenses, the communication parameter determination unit 501 changes the time length that can be used for image data transmission by the camera adapter 113 to be twice the time lengths for other camera adapters. The communication parameter acquisition unit 403 divides the time period between the times T1-0 and T2-0 based on the determined time length to determine the time period during which each camera adapter 111 performs image data transmission. Thus, as illustrated in FIG. 6B, the time length that can be used for image data transmission by the camera adapter 113 is twice the time lengths for other camera adapters. The ratio of the time length that can be used for image data transmission does not necessarily need to be identical to the ratio of the focal length. The time length is determined so that at least the time length of the transmission of the image data based on image capturing by one of the cameras 101 to 104 that has a longer focal length becomes longer than the time lengths for the other one of the cameras 101 to 104.

Thus, the control server 300 determines the time length during which the communication path can be used for image data communication, based on the focal length of the respective lenses 121 to 124 included in the corresponding one of the cameras 101 to 104. The communication parameters can be determined based on various information included in the camera information, in addition to the focal length. For example, the communication parameter determination unit 501 estimates the data amount of the generated foreground image as an imaging condition based on the information about items (1) and (6) included in the camera information. It is estimated that the data amount of the image data increases with increasing sensor size. It is also estimated that the foreground region enlarges and the data amount of the image data increases with decreasing distance between the respective cameras 101 to 104 and the imaging region. The communication parameter determination unit 501 can determine the time length during which the communication path can be used for image data communication, based on the ratio of the data amount estimated for each of the cameras 101 to 104. This enables ensuring a longer time length for the camera adapters that can transmit a larger amount of image data.

The distance between the camera 101 and the imaging region can be identified based on the information about the installation position, the image capturing direction, and the focal length of the camera 101. Thus, the control server 300 acquires information that enables identification of the distance between the camera 101 and the imaging region to determine the time length.

The communication parameter determination unit 501 can also acquire the information about the item (9) included in the camera information and, based on the data amount of the past image data, estimate the data amount of the image data to be generated in the following image capturing. In a case where image capturing is performed in succession as in moving image capturing, the position of an object hardly quickly changes in a short time between image capturings. Thus, since it is estimated that the data amount of the foreground image also changes small, the communication parameter determination unit 501 can estimate the data amount of the image data to be generated in the following image capturing.

The communication parameter determination unit 501 may determine the communication parameters as imaging conditions based on the information about the item (4) included in the camera information. For example, in a case where the imaging range to be captured by the camera 101 includes a region outside the generation region for generating three-dimensional geometric data, the foreground image corresponding to the object existing in the region outside the generation region can be deleted by the data amount reduction unit 404 or generation thereof can be omitted. In this configuration, the communication parameters are determined taking into account the data amount of the foreground image to be deleted or not to be generated.

Examples where the data amount is estimated based on the imaging range to be captured by the respective cameras 101 to 104 will be described below with reference to FIGS. 9 and 10. FIG. 9 illustrates examples of arrangements of the cameras 101 and 102. FIG. 10 illustrates examples of captured images acquired by the cameras 101 and 102 in the examples illustrated in FIG. 9. Referring to FIG. 10, captured images 132 and 131 are acquired by the cameras 102 and 101, respectively.

Referring to FIG. 9, a field 150 indicates the generation region for which three-dimensional geometric data is to be generated by the image processing server 100. More specifically, three-dimensional geometric data is generated for the object present in the field 150, and not generated for the object present outside the field 150. Referring to FIG. 9, the imaging range 132 of the camera 102 is included in the field 150. The imaging range 131 captured by the camera 101 includes a range 140 included in the field 150 and a range 141 not included in the field 150. Referring to FIG. 9, a player 202 is present in the field 150, and a player 203 is present outside the field 150. More specifically, even after the camera adapter 111 generates a foreground image 259 corresponding to the player 203 and transmits the image to the image processing server 100, three-dimensional geometric data is not generated. In such a case, the camera adapter 111 reduces the data amount of the image data to be communicated, by deleting or not generating the foreground image corresponding to the player 203.

Thus, in a case where there is an imaging apparatus that captures an image of a region not subjected to generation of three-dimensional geometric data, the communication parameter determination unit 501 determines the communication parameters based on the size of the range included in the region for which three-dimensional geometric data is not generated. For example, referring to the example in FIG. 9, if the range included in the region for which three-dimensional geometric data is generated is 50% of the entire imaging range of the camera 101. In this case, the communication parameter determination unit 501 sets the time length that can be used for image data transmission by the camera 101 to 50% of the time length that can be used by the camera 102. Thus, the control server 300 can determine the communication parameters based on the imaging range to be captured by the respective cameras 101 to 104.

The imaging range to be captured by the respective cameras 101 to 104 may also be identified based on the information other than the information about the item (4) included in the camera information. For example, in a case where there is not the information about the item (4), the imaging range can be identified based on the information about the installation position, the image capturing direction, and the focal length of the respective camera 101 to 104. Thus, the control server 300 acquires information that enables identification of the imaging range to determine the time length.

The camera adapter 111 performs communication under the control of the control server 300. At this time, the data amount reduction unit 404 in the camera adapter 111 calculates the data amount that can be transmitted in the time length determined by the control server 300 and reduces the data amount of the image data to fit the image data into the calculated data amount.

In time-division multiplex communication, the control server 300 determines the time lengths during which the communication path can be used for image data communication, based on the camera information, and controls communication by the camera adapters 111 to 114. This enables image data communication with effective utilization of the communication path. The control server 300 first determines the communication parameters based on the camera information acquired when the image processing system 10 is activated. In the following processing, the control server 300 periodically acquires the camera information and dynamically changes the communication parameters when the camera information is changed. This configuration also applies to the following communication methods. The configuration is not limited thereto. The communication parameters determined first may be used by when the image processing system 10 is deactivated. In this case, when imaging conditions, such as the focal length of the respective camera 101 to 104, remain unchanged from the initial values, the communication parameters determined based on the initial values are preset to each of the camera adapters 111 to 114. This configuration enables reduction in the processing load relating to the determination of the communication parameters. This configuration is also applicable to the bandwidth multiplex method and the token passing method (described below).

<Bandwidth Multiplex Method>

An example where the camera adapters 111 to 114 perform image data communication by using the bandwidth multiplex method in the image processing system 10 will be described below. FIGS. 7A and 7B are timing charts each illustrating the timing when the camera adapters 111 to 114 perform image data communication by using the bandwidth multiplex method. The timing of image data transmission in the initial state will be described below with reference to FIG. 7A.

The times T1-0, T2-0, . . . are similar to the times in FIGS. 6A and 6B. Each of the camera adapters 111 to 114 performs image data transmission by using the bandwidth determined by dividing the communication bandwidth of the communication path by the number of cameras. For example, in a case where the communication bandwidth of the communication path is 10 G bits per second (bps), the camera adapters 111 to 114 perform image data transmission at a communication throughput (transmission rate) of 2.5 G bps, which is obtained by dividing 10 G into quarters. More specifically, the camera adapters 111, 112, 113, and 114 divide image data 2001a, 2001b, 2001c, and 2001d, respectively, generated by themselves into communication packets, and perform packet transmission at the frequency determined based on the determined throughput. The communication throughput may be determined based not only on the communication bandwidth of the communication path but also on the image data reception performance of the camera adapters 111 to 114.

FIG. 7B illustrates an example in which the image data throughput is changed based on the focal length of the respective lenses 121 to 124. Referring to the example illustrated in FIG. 7B, the focal length of the lens 123 is changed to be longer than the focal lengths of the other lenses 121, 122, and 124. When the focal lengths of the lenses 121 to 124 differ for a reason similar to that for the time-division multiplex method, the communication path may not be effectively utilized at the time of image data transmission. Thus, the control server 300 determines the time length that can be used for image data communication by each of the camera adapters 111 to 114, based on the focal length of the respective lenses 121 to 124. The control server 300 determines the frequency of packet transmission performed by each of the camera adapter 111 to 114, based on the determined time length, and controls the camera adapters 111 to 114 to perform packet communication at the determined frequency. The frequency of packet transmission is represented by the number of packets to be transmitted in unit time.

The information acquisition unit 500 in the control server 300 acquires the information about the focal length of each of the cameras 101 to 104 (the information about the item (3) included in the camera information) and transmits the information to the communication parameter determination unit 501. The communication parameter determination unit 501 determines the throughput of image data transmission by each of the camera adapters 111 to 114 as a communication parameter. For example, when the focal length of the lens 123 is twice the focal lengths of other lenses, the communication parameter determination unit 501 changes the throughput for the camera adapter 113 to transmit image data to be twice the throughputs of other camera adapters. As illustrated in FIG. 7B, the throughput that can be used for image data transmission performed by the camera adapter 113 becomes twice the throughputs of other camera adapters. The ratio of the throughput that can be used for image data transmission does not necessarily need to be identical to the ratio of the focal length. The throughput is determined so that at least the throughput corresponding to one, out of the cameras 101 to 104, having a longer focal length becomes larger than the throughputs of other cameras. The control server 300 controls the frequency of image data packet transmission performed by each of the camera adapters 111 to 114 based on the determined throughput.

As in the time-division multiplex method, the control server 300 can determine the throughput based on various information (e.g., the information about the times (1), (4), (6) and (9)) included in the camera information. The camera adapters 111 to 114 perform communication under the control of the control server 300. At this time, the data amount reduction unit 404 in the respective camera adapters 111 to 114 calculates the data amount that can be transmitted during the time period from when image capturing is performed to when the following image capturing is performed based on the throughput determined by the control server 300. The data amount reduction unit 404 reduces the data amount of the image data to fit the image data into the calculated data amount.

Thus, in bandwidth multiplex communication, the control server 300 determines the throughput that can be used for image data communication, based on the camera information, and controls communication by the camera adapters 111 to 114. This enables image data communication that effectively utilizes the communication path.

<Token Passing Method>

Figure 8A:
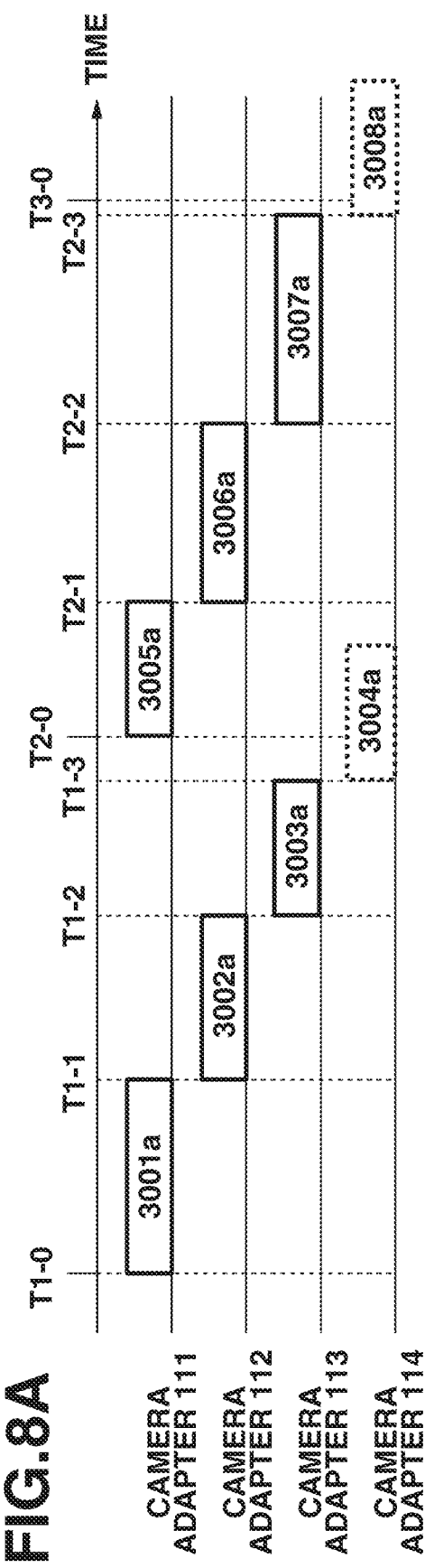
FIGS. 8A and 8B are timing charts each illustrating timing of image data transmission in communication based on a token passing method.
Figure 8B:
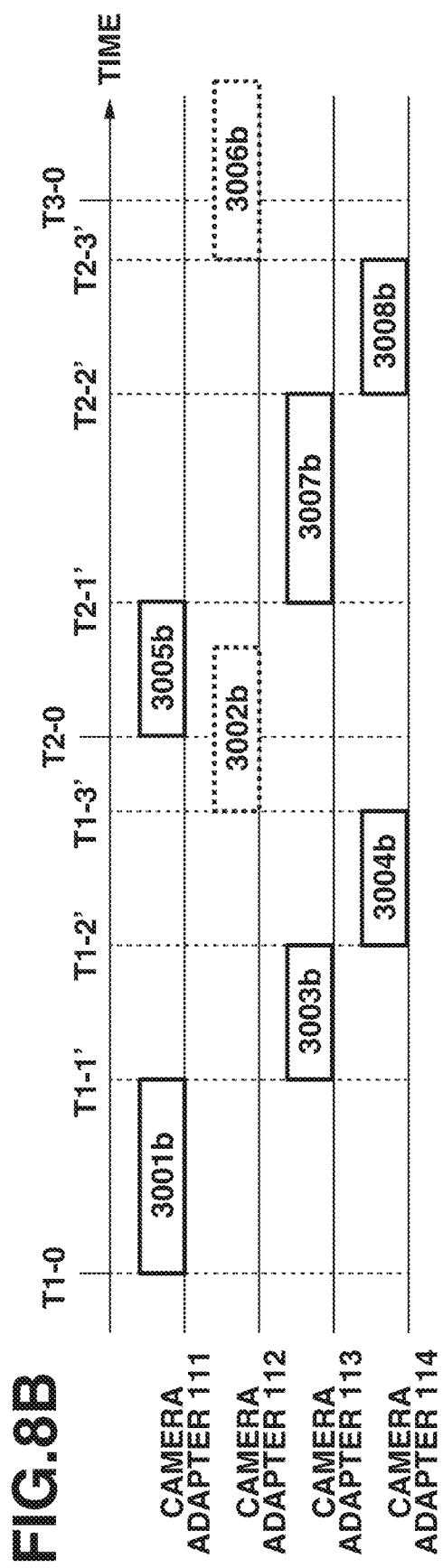

A description will be provided of an example in which the camera adapters 111 to 114 perform image data communication by using the token passing method in the image processing system 10. FIGS. 8A and 8B are timing charts each illustrating the timing of image data transmission in a case where the camera adapters 111 to 114 perform communication by using the token passing method. The timing of image data transmission in the initial state will be described below with reference to FIG. 8A.

The times T1-0, T2-0, . . . are similar to the times in FIGS. 6A, 6B, 7A, and 7B. Referring to the example in FIG. 8A, image data transmission is performed by the camera adapters 111, 112, 113, and 114 in this order. Each of the camera adapters 111, 112, 113, and 114 starts image data transmission after completion of previous image data transmission. The example in FIG. 8A illustrates that the camera adapter 114 does not complete the transmission of image data 3004a by the time T2-0 at which the following image capturing is to be performed. In this case, the camera adapter 114 stops transmission of the image data 3004a or does not transmit the entire image data 3004a. Thus, part or whole of the image data 3004a will be lost. In this way, even important image data may possibly be lost depending on the order of image data transmission.

FIG. 8B illustrates an example in which the order of image data transmission is changed based on the camera information. Although the camera information can include the preset priority for each of the cameras 101 to 104 (the information about the item (8) included in the camera information), the control server 300 can determine the priority as a communication parameter in consideration of other information included in the camera information.

FIG. 8B illustrates an example where the order of image data transmission is changed based on the camera information. Referring to the example in FIG. 8B, since the lens 121 has a long focal length, the data amount of the image data 3001b to be transmitted by the camera adapter 111 is larger than the data amounts for other camera adapters 112, 113, and 114. Assume that the camera 102 captures a partial region having lower priority than partial regions for other cameras 101, 103, and 104. For example, the communication parameter determination unit 501 determines the priority based on the information about the focal length included in the camera information acquired by the information acquisition unit 500. The communication parameter determination unit 501 prestores a table in which the focal length is in association with the priority in the auxiliary storage device 1404, and refers to the table to determine the priority. The control server 300 determines the transmission timing for each piece of image data based on the determined priority. Thus, the image data 3001b is transmitted by the camera adapter 111 in a prioritized way. The order of the transmission of the image data based on image capturing by the ones having the same focal length out of the cameras 101 to 104 is determined based on the preset priority (the information about the item (8) included in the camera information). As described above, important image data is transmitted in a prioritized way. This prevents important image data from being lost.

The communication parameter determination unit 501 may include a table in which the information about the items (1), (4), (6), and (9) included in the camera information is in association with the priority in addition to the focal length. The communication parameter determination unit 501 may store a table in which each piece of the camera information is in association with a value indicating the priority, and determine the priority so that corresponding image data transmission is performed in descending order of the sum of the values indicating the priority. Referring to the example in FIG. 8B, although the priority determined at the time T1-0 is also applied to the time T2-0 and subsequent time, this is not restrictive. The priority may be dynamically changed according to changes of the camera information.

Here, a camera adapter, out of the camera adapters 111 to 114, that is unable to complete image data transmission by the time of the following image capturing may take measures by stopping or not performing image data transmission. However, this is not restrictive. For example, the data amount reduction unit 404 determines that image data transmission cannot be completed based on the communication parameters and calculates the data amount that can be transmitted during the time period by the time when the following image capturing is performed. The data amount reduction unit 404 reduces the data amount of the image data so as to fit the image data into the data amount resulting from the calculation.

In this way, in the communication using the token passing method, the control server 300 determines the priority of image data transmission based on the camera information, and controls communication by the camera adapters 111 to 114. This enables important image data to be prevented from being lost. The processing of determining the priority and controlling the order of image data transmission is also applicable to the time-division multiplex method.

The foregoing are descriptions of methods of determining the communication parameters in a case where each of the time-division multiplex, the bandwidth multiplex, and the token passing methods is used as the communication method in the image processing system 10. In the image processing system 10 according to the present exemplary embodiment, the communication method to be used is preset based on a user specification or the like. From the time of activation, the image processing system 10 performs communication based on the preset communication method.

Figure 11:
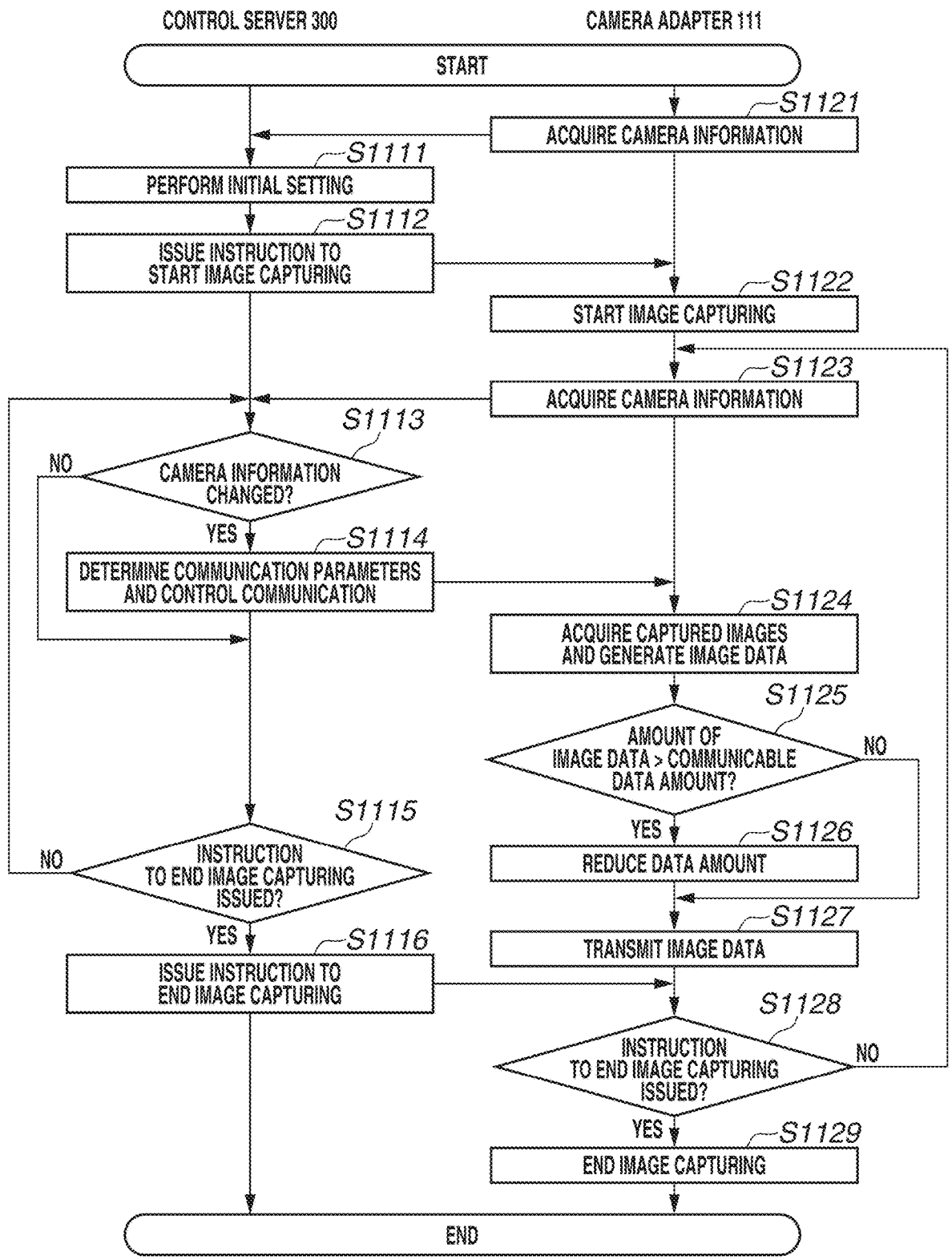
FIG. 11 is a flowchart illustrating processing performed by the camera adapters and the control server.

FIG. 11 is a flowchart illustrating processing performed by the camera adapter 111 and the control server 300 according to the present exemplary embodiment. The processing in FIG. 11 is implemented by each of the CPUs of the respective camera adapters 111 to 114 and the control server 300 reading a program stored in the ROM or the auxiliary storage device and then executes the program. When the image processing system 10 is activated based on a user instruction, processing is started.

In step S1121, the camera information acquisition unit 402 in the respective camera adapters 111 to 114 acquire the camera information from the corresponding one of the cameras 101 to 104 and transmit the information to the control server 300. In step S1111, the control server 300 initializes the entire image processing system 10. Here, the control server 300 determines the communication method to be used by the image processing system 10. The communication parameter determination unit 501 in the control server 300 determines the initial values of the communication parameters as initial settings, based on the camera information transmitted from the respective camera adapters 111 to 114. If the respective camera adapters 111 to 114 do not perform the operation in step S1121 and hence the control server 300 does not acquire the camera information, the control server 300 makes setting to enable communication in the initial state by the communication method.

In step S1112, the control server 300 transmits an instruction to start image capturing to the respective camera adapters 111 to 114 based on a user input. When the instruction to start image capturing is transmitted from the control server 300, then in step S1122, the respective camera adapters 111 to 114 control the corresponding one of the cameras 101 to 104 directly connected thereto to start image capturing. In step S1123, the camera information acquisition unit 402 in the respective camera adapters 111 to 114 periodically acquires the camera information from the corresponding one of the cameras 101 to 104 while the respective cameras 101 to 104 are performing image capturing. The frequency at which the camera information acquisition unit 402 acquires the camera information is determined, for example, at the time of initial setting in step S1111. The camera information acquisition unit 402 transmits the acquired camera information to the control server 300.

In step S1113, the information acquisition unit 500 in the control server 300 acquires the camera information transmitted from the respective camera adapters 111 to 114, and transmits the information to the communication parameter determination unit 501. The communication parameter determination unit 501 determines whether the acquired camera information has been changed from the currently stored camera information. If the acquired camera information has been changed (YES in step S1113), the processing proceeds to step S1114. In step S1114, the communication parameter determination unit 501 determines the communication parameters based on the information about the items (1), (3), (4), (6), (8), and (9) included in the camera information. The communication parameters determined here include the time length in the time-division multiplex method, the throughput in the bandwidth multiplex method, and the priority in the token passing method. The control unit 502 transmits the determined communication parameters to the respective camera adapters 111 to 114, and controls the respective camera adapters 111 to 114 to perform communication based on the communication parameters. On the other hand, if the communication parameter determination unit 501 determines that the acquired camera information has not been changed (NO in step S1113), the operation in step S1114 is skipped.

In step S1124, the image acquisition unit 400 in the respective camera adapters 111 to 114 acquire the captured image from the corresponding one of the cameras 101 to 104. The foreground extraction unit 401 extracts the foreground region from the captured image acquired by the image acquisition unit 400 and generates image data (foreground image) including texture data and silhouette data for the object. In step S1125, the data amount reduction unit 404 determines whether the data amount of the generated image data exceeds the communicable data amount determined based on the communication parameters. At this time, if the communication parameters have been transmitted from the control server 300 in step S1114, the data amount reduction unit 404 uses the acquired communication parameters for this determination. If the data amount reduction unit 404 determines that the data amount of the generated image data exceeds the communicable data amount (YES in step S1125), the processing proceeds to step S1126. In step S1126, the data amount reduction unit 404 performs a process of reducing the data amount of the image data to fit the image data into the communicable data amount. If the data amount reduction unit 404 determines that the data amount of the generated image data does not exceed the communicable data amount (NO in step S1125), the operation in step S1126 is skipped.

In step S1127, the communication unit 405 in the respective camera adapters 111 to 114 transmits the image data to the downstream camera adapter or the image processing server 100 under the control of the control server 300. In step S1115, the control server 300 determines whether an instruction to end image capturing is issued by a user input. If the control server 300 determines that the instruction is issued (YES in step S1115), the processing proceeds to step S1116. In step S1116, the control server 300 transmits the instruction to end image capturing to the respective camera adapters 111 to 114. If the control server 300 determines that the instruction is not issued (NO in step S1115), the processing returns to step S1113. The control server 300 performs the operations in step S1113 and subsequent steps again. In step S1128, the respective camera adapters 111 to 114 determine whether an instruction to end image capturing is issued from the control server 300. If the respective camera adapters 111 to 114 determine that the instruction is issued (YES in step S1128), the processing proceeds to step S1129. In step S1129, the respective camera adapters 111 to 114 control the corresponding one of the cameras 101 to 104 to end image capturing. If the control server 300 determines that the instruction to end image capturing is not issued (NO in step S1128), the processing returns to step S1123. The respective camera adapter 111 to 114 perform the operations in step S1123 and subsequent steps again. In step S1129, in response to the respective cameras 101 to 104 ending image capturing, the control server 300 and the respective camera adapters 111 to 114 end processing.

The control server 300 according to the present exemplary embodiment determines the time length that can be used for communication of a plurality of pieces of image data by the respective camera adapters 111 to 114, based on the imaging conditions of the corresponding one of the cameras 101 to 104, and performs control so that communication using the predetermined communication path is performed in the determined time length. This enables the control server 300 to effectively utilize the communication path and prevent the degradation of the communication efficiency and the occurrence of a loss of image data.

A second exemplary embodiment of the present disclosure will be described below. In the first exemplary embodiment, a description has been provided of an example in which all of the cameras 101 to 104 perform image capturing at the same frame rate. In the present exemplary embodiment, a description will be provided of a communication method in a case where a plurality of cameras 101 to 104 includes one(s) having different frame rates. The configuration of the image processing system 10, and the function and hardware configuration of each apparatus included in the image processing system 10 are similar to those in the first exemplary embodiment, and redundant descriptions thereof will be omitted.

FIGS. 12A and 12B illustrate methods in which a plurality of cameras 101 to 104 including one having different imaging frame rates transmits image data based on the time-division multiplex method. Referring to the example in FIGS. 12A and 12B, the cameras 101 and 103 perform image capturing at 60 fps, and the cameras 102 and 104 perform image capturing at 30 fps. The time period between the times T1-0 and T2-0 is 1/60 second. The cameras 101 and 103 perform image capturing at the times T1-0, T2-0, T3-0, . . . . On the other hand, the cameras 102 and 104 perform image capturing at the times T1-0, T3-0, . . . , since the imaging frame rate is 30 fps.

FIG. 12A illustrates an example where each of the camera adapters 111 to 114 performs communication in synchronization with image capturing performed at 60 fps. Referring to the example in FIG. 12A, the camera adapters 111 to 114 perform image data communication during the time period between the time T1-0 at which image capturing is performed and the time T2-0 at which the following image capturing is performed. The time length that can be used for communication is also determined so that four pieces of image data are to be transmitted. On the other hand, between the times T2-0 and T3-0, the camera adapters 112 and 114 do not transmit image data because the cameras 102 and 104 do not perform image capturing. Thus, the time length is determined so that two pieces of image data are transmitted between the times T2-0 and T3-0. If communication is performed in this way, the number of pieces of image data to be transmitted is larger than that at other time, in a case where the timing of image capturing by the cameras 101 to 104 is synchronized, and hence a loss of image data is likely to occur. The control server 300 according to the present exemplary embodiment determines the timing at which each of the camera adapters 111 to 114 transmits image data, thus preventing the occurrence of this issue.

Referring to the example illustrated in FIG. 12B, as in FIG. 12A, the cameras 101 and 103 perform image capturing at the times T1-0, T2-0, T3-0, . . . . The cameras 102 and 104 perform image capturing at the times T1-0, T3-0, . . . . Referring to the example illustrated in FIG. 12B, however, the timing at which the camera adapter 114 transmits image data is changed from that in FIG. 12A. The camera adapters 111 to 114 perform image capturing at the time T1-0, then generate image data, and start image data transmission at a predetermined timing. At this time, the control server 300 shifts the transmission timing for either one of the pieces of image data corresponding to the cameras 102 and 104 that perform image capturing at 30 fps. Referring to the example illustrated in FIG. 12B, the timing of image data transmission by the camera adapter 114 is delayed from the timing of image data transmission by the camera adapter 113 by 0.5 frames. By controlling the timing to start image data transmission in this way, the control server 300 can prevent the data amount of the image data from exceeding the data amount communicable during a predetermined period.

As in the first exemplary embodiment, the control server 300 according to the present exemplary embodiment estimates the data amount for each piece of image data based on the camera information (e.g., the focal length). The control server 300 determines the timing of image data transmission based on the estimated value of the data amount. At this time, the control server 300 determines the transmission timing so that the data amount of the image data to be transmitted between the times T1-0 and T2-0 becomes as equal to the data amount of the image data to be transmitted between the times T2-0 and T3-0 as possible. In the example in FIG. 12B, there are two cameras having an imaging frame rate of 30 fps. However, even if there are three or more cameras having this imaging frame rate, the timing of image data transmission can be determined by using the above-described method. In a case where the timing of image data transmission is shifted, the order of image data transmission is to be determined based on the priority determined by similar processing to the processing according to the first exemplary embodiment.

As discussed above, the control server 300 according to the present exemplary embodiment determines the timing of image data transmission based on captured images acquired by the plurality of cameras including cameras having different imaging frame rates. A camera having a frame rate of 30 fps is used to acquire a background image such as seats and the ground of a stadium. Since the object corresponding to the foreground is assumed to largely change in motion, it is desirable to perform image capturing to generate a foreground image by using a camera having a higher frame rate. However, since the background region is assumed to change smaller in motion than the object corresponding to the foreground, the image of the background region is captured by using a camera having a lower frame rate than the camera used to capture the foreground, to generate a background image. This reduces the number of background images to be generated, making it possible to reduce the processing load. Naturally, a foreground image may be generated by using a captured image acquired by a camera having a frame rate of 30 fps.

In the present exemplary embodiment, a description has been provided of an example where the time-division multiplex method is used. The control server 300 can also determine the transmission timing similarly, even in a case where the token passing method is used. In a case where the bandwidth multiplex method is used, the control server 300 determines the ratio for dividing the bandwidth, based on the ratio between the imaging frame rates of the cameras 101 to 104, in addition to the method according to the first exemplary embodiment.

Other Exemplary Embodiments

In the first and the second exemplary embodiments, a description has been provided of an example in which a plurality of camera adapters in a daisy chain connection performs image data communication. However, the method according to each exemplary embodiment is also applicable to a case where a plurality of camera adapters 111 to 114 performs communication by using other network topologies.

Assume an example in which a plurality of camera adapters 111 to 114 are connected to the image processing server 100 in a star connection. In such a case, each of the camera adapters 111 to 114 can perform direct image data transmission by using the communication path connected to the image processing server 100. However, if a plurality of pieces of image data is transmitted without taking into account the data amount of the image data or the transmission timing, the image processing server 100 becomes unable to receive at least part of the plurality of pieces of image data transmitted from each of the camera adapters 111 to 114 depending on the receiving capability of the image processing server 100 and the bandwidth of the communication path. Accordingly, part or whole of image data may be lost. Thus, also in a star connection, the loss of image data can be prevented by using the time-division multiplex, the bandwidth multiplex, and the token passing methods and adjusting the data amount of the image data to be received not to exceed the receiving capability of the image processing server 100 and the bandwidth of the communication path. In addition, by determining the time length that can be used for image data communication based on the image capturing conditions (including the focal length, the imaging range, and the distance from the imaging region) of a plurality of imaging apparatuses, the communication path can be used more efficiently with receiving capability on the image data reception side taken into account. This is not limited to the star connection but also applied to 'bus' (where each imaging apparatus may be connected to a communication bus) and 'mesh' (where connections may exist between any two imaging apparatuses and/or the control server) connections.

As discussed above, the methods according to the first and the second exemplary embodiments exhibit their advantageous effects in various connection methods. The above-described exemplary embodiments can also be applied to communication based on a combination of a plurality of communication methods. An example of a combination of the time-division multiplex and the bandwidth multiplex methods will be described below. A predetermined time length in the time-division multiplex method is assigned to each of the camera adapters 111 to 114. At this time, the time lengths each to be assigned to the respective camera adapters 111 to 114 are at least partly duplicated. At the time of communication, each of the camera adapters 111 to 114 divides data into packets and transmits packets at a predetermined frequency. In this case, at least one of the predetermined time length and the predetermined frequency to be assigned to the respective the camera adapters 111 to 114 are determined by the method according to the above-described exemplary embodiments. Combining the time-division multiplex and the bandwidth multiplex methods in this way enables performing communication while permitting the duplication of data communication timing. This makes it possible to more flexibly handle variations in the data amount of transmission data.

The present disclosure makes it possible to prevent a loss of image data due to increase in the data amount of image data depending on imaging conditions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-103906, filed Jun. 16, 2020, which is hereby incorporated by reference herein in its entirety.

What is claimed is:

1. A control apparatus comprising:
one or more memories storing instructions; and
one or more processors executing the instructions to:
acquire information about an imaging condition of a plurality of imaging apparatuses and including at least one of information indicating a focal length of each of the plurality of imaging apparatuses, information that enables identification of an imaging range to be subjected to image capturing by each of the plurality of imaging apparatuses, and information that enables identification of a distance between each of the plurality of imaging apparatuses and an imaging region to be subjected to image capturing by the plurality of imaging apparatuses;
determine a time length during which each of a plurality of pieces of image data based on image capturing by the plurality of imaging apparatuses is communicable, based on the acquired information, the image data corresponding to a foreground region extracted from a captured image acquired through image capturing by each of the plurality of imaging apparatuses; and
control so that communication of the plurality of pieces of image data is performed in accordance with the determined time length and with a data amount communicable in the determined time length not being exceeded.

2. The control apparatus according to claim 1, wherein, in a case where a focal length of a first imaging apparatus included in the plurality of imaging apparatuses is longer than a focal length of a second imaging apparatus included in the plurality of imaging apparatuses, the time length is determined so that a time length during which image data based on image capturing by the first imaging apparatus is communicable is longer than a time length during which image data based on image capturing by the second imaging apparatus is communicable.

3. The control apparatus according to claim 1, wherein, in a case where a ratio of an imaging range included in a predetermined region out of an entire imaging range to be subjected to image capturing by a first imaging apparatus included in the plurality of imaging apparatuses is larger than a ratio of an imaging range included in the predetermined region out of an entire imaging range to be subjected to image capturing by a second imaging apparatus included in the plurality of imaging apparatuses, the time length is determined so that a time length during which image data based on image capturing by the first imaging apparatus is communicable becomes longer than a time length during which image data based on image capturing by the second imaging apparatus is communicable.

4. The control apparatus according to claim 3, wherein, in an imaging region to be subjected to image capturing by the plurality of imaging apparatuses, the predetermined region is a region to be subjected to generation of geometric data for an object based on the plurality of pieces of image data.

5. The control apparatus according to claim 1, wherein, in a case where a distance between a first imaging apparatus included in the plurality of imaging apparatuses and the imaging region is shorter than a distance between a second imaging apparatus included in the plurality of imaging apparatuses and the imaging region, the time length is determined so that a time length during which image data based on image capturing by the first imaging apparatus is communicable is longer than a time length during which image data based on image capturing by the second imaging apparatus is communicable.

6. The control apparatus according to claim 1,
wherein the one or more processors further execute the instructions to acquires information indicating a data amount of image data based on image capturing performed by the plurality of imaging apparatuses in the past, and
wherein the time length is determined further based on the data amount indicated by the acquired information.

7. The control apparatus according to claim 1, wherein the one or more processors execute the instructions to determine a time length during which each piece of image data is communicable during a time period identified based on a frame rate at which the plurality of imaging apparatuses performs image capturing.

8. The control apparatus according to claim 1, wherein the one or more processors execute the instructions to determine a ratio for dividing a time period identified based on a frame rate at which the plurality of imaging apparatuses performs image capturing, based on the acquired information, and divides the time period based on the determined ratio to determine the time length.

9. The control apparatus according to claim 1,
wherein the one or more processors execute the instructions to determine a frequency for transmitting a packet of each of the plurality of pieces of image data during a time period identified based on a frame rate at which the plurality of imaging apparatuses performs image capturing based on a time length corresponding to each of the plurality of pieces of image data, and
wherein communication of a packet of each of the plurality of pieces of image data is performed in accordance with the determined frequency.

10. The control apparatus according to claim 1
wherein the one or more processors further execute the instructions to acquires information indicating a priority of each of the plurality of pieces of image data, and to
determine an order to start communication of each of the plurality of pieces of image data based on the priority indicated by the acquired information.

11. The control apparatus according to claim 1, wherein, in a case where a data amount of the plurality of pieces of image data exceeds the data amount communicable in the determined time length, processing of reducing at least a part of the plurality of pieces of image data is performed.

12. A control method that is performed by a control apparatus, the method comprising:
acquiring information about an imaging condition of a plurality of imaging apparatuses and including at least one of information indicating a focal length of each of the plurality of imaging apparatuses, information that enables identification of an imaging range to be subjected to image capturing by each of the plurality of imaging apparatuses, and information that enables identification of a distance between each of the plurality of imaging apparatuses and an imaging region to be subjected to image capturing by the plurality of imaging apparatuses;
determining a time length during which each of a plurality of pieces of image data based on image capturing by the plurality of imaging apparatuses is communicable, based on the acquired information, the image data corresponding to a foreground region extracted from a captured image acquired through image capturing by each of the plurality of imaging apparatuses; and
performing control so that communication of the plurality of pieces of image data is performed in accordance with the determined time length and with a data amount communicable in the time length determined not being exceeded.

13. A non-transitory computer-readable storage medium storing a program for causing a computer to execute a method, the method comprising:
acquiring information about an imaging condition of a plurality of imaging apparatuses and including at least one of information indicating a focal length of each of the plurality of imaging apparatuses, information that enables identification of an imaging range to be subjected to image capturing by each of the plurality of imaging apparatuses, and information that enables identification of a distance between each of the plurality of imaging apparatuses and an imaging region to be subjected to image capturing by the plurality of imaging apparatuses;
determining a time length during which each of a plurality of pieces of image data based on image capturing by the plurality of imaging apparatuses is communicable, based on the acquired information, the image data corresponding to a foreground region extracted from a captured image acquired through image capturing by each of the plurality of imaging apparatuses; and
performing control so that communication of the plurality of pieces of image data is performed in accordance with the determined time length and with a data amount communicable in the time length determined not being exceeded.

14. A system comprising:
a first image processing apparatus configured to transmit, in a first time length, first image data corresponding to a foreground region extracted from a captured image acquired through image capturing by a first imaging apparatus, the first time length being a time length during which the first image data is communicable, the first image data being used in generation of a three dimensional shape data representing a three dimensional shape of the foreground region; and
a second image processing apparatus configured to transmit, in a second time length, image data corresponding to a foreground region extracted from a captured image acquired through image capturing by a second imaging apparatus, he second time length being a time length during which the second image data is communicable, the second image data being used in generation of a three dimensional shape data representing a three dimensional shape of the foreground region, a focal length of the first imaging apparatus being longer than a focal length of the second imaging apparatus, and the first time length being longer than the second time length.

15. The system according to claim 14,
wherein the first image processing apparatus is connected with the second image processing apparatus via a daisy chain.

16. The system according to claim 14,
wherein the first image processing apparatus transmits the first image data to the second image processing apparatus; and
wherein second image processing apparatus transmits the first image data received from the first image processing apparatus and the second image data.

17. The system according to claim 14,
wherein the second image processing apparatus transmits the second image data to the first image processing apparatus; and
wherein first image processing apparatus transmits the second image data received from the second image processing apparatus and the first image data.

* * * * *